(12) United States Patent
Greifeneder et al.

(10) Patent No.: US 8,533,687 B1
(45) Date of Patent: Sep. 10, 2013

(54) METHODS AND SYSTEM FOR GLOBAL REAL-TIME TRANSACTION TRACING

(75) Inventors: Bernd Greifeneder, Linz (AT); Christtan Schwarzbauer, Linz (AT); Markus Pfleger, Johann am Wimberg (AT)

(73) Assignee: dynaTrade Software GmbH (AT)

( * ) Notice: Subject to any disclaimer, the term of this patent is extended or adjusted under 35 U.S.C. 154(b) by 954 days.

(21) Appl. No.: 12/627,183

(22) Filed: Nov. 30, 2009

(51) Int. Cl.
*G06F 9/44* (2006.01)

(52) U.S. Cl.
USPC .......................................... 717/130; 717/127

(58) Field of Classification Search
None
See application file for complete search history.

(56) References Cited

U.S. PATENT DOCUMENTS

| | | | |
|---|---|---|---|
| 5,432,932 A | 7/1995 | Chen |
| 5,727,147 A | 3/1998 | vanHoff |
| 5,781,778 A | 7/1998 | Meier |
| 5,794,046 A | 8/1998 | Meier |
| 5,867,712 A | 2/1999 | Shaw |
| 5,933,639 A | 8/1999 | Meier |
| 5,953,530 A | 9/1999 | Rishi |
| 6,101,524 A | 8/2000 | Choi |
| 6,102,966 A | 8/2000 | Tyma |
| 6,134,603 A | 10/2000 | Jones |
| 6,145,121 A | 11/2000 | Levy |
| 6,151,639 A | 11/2000 | Tucker |
| 6,202,199 B1 | 3/2001 | Wygodny |
| 6,266,805 B1 | 7/2001 | Nwana |
| 6,332,212 B1 | 12/2001 | Organ |
| 6,539,541 B1 | 3/2003 | Geva |
| 6,721,941 B1 | 4/2004 | Morshed |
| 6,754,890 B1 | 6/2004 | Berry |
| 6,760,903 B1 | 7/2004 | Morshed |
| 6,795,962 B1 | 9/2004 | Hanson |
| 6,862,711 B1 | 3/2005 | Bahrs |
| 6,961,926 B2 | 11/2005 | Koyama |
| 6,968,540 B2 | 11/2005 | Beck |
| 6,978,444 B1 | 12/2005 | Farchi |
| 7,143,392 B2 | 11/2006 | Li |
| 7,162,710 B1 | 1/2007 | Edwards |
| 7,263,689 B1 | 8/2007 | Edwards |
| 7,293,259 B1 | 11/2007 | Dmitriev |

(Continued)

OTHER PUBLICATIONS

Kuang et al., "E AHRW: An energy efficient adaptive hash scheduler for stream processing on multicore servers," IEEE, pp. 45-56, 2011.

(Continued)

*Primary Examiner* — Kris Rhu
(74) *Attorney, Agent, or Firm* — Robert Plotkin, P.C.

(57) ABSTRACT

Methods and systems for out-of-application bytecode instrumentation and performance monitoring of applications, such as globally-distributed applications, decouple (1) acquiring measurements through sensor execution at applications; (2) instrumenting application bytecode with sensor bytecode and buffering and sending measurements at collector nodes; and (3) controlling instrumentation and correlating measurements at a central monitoring node. Collector nodes and applications may employ secured, high bandwidth network connections (e.g., a typical LAN connection). Collector nodes and the central monitoring node may employ non-secured, lower-bandwidth network connections (e.g., a typical WAN connection) and may use encryption and/or compression without burdening the monitored application. Multiple parallel instrumentation engines in collector nodes eliminate the possible instrumentation bottleneck presented by one centralized instrumentation engine in a single server. Moreover, decentralized buffering of monitoring event data allows management of peak measurement loads on the monitoring node.

38 Claims, 23 Drawing Sheets

(56) References Cited

U.S. PATENT DOCUMENTS

| | | |
|---|---|---|
| 7,293,260 B1 | 11/2007 | Dmitriev |
| 7,367,025 B1 | 4/2008 | Nikolov |
| 7,376,940 B1 | 5/2008 | Bush |
| 7,380,239 B1 | 5/2008 | Srivastava |
| 7,409,676 B2 | 8/2008 | Agarwal |
| 7,493,607 B2 | 2/2009 | Moritz |
| 7,496,903 B2 | 2/2009 | Rees |
| 7,500,227 B1 | 3/2009 | Fontana |
| 7,526,760 B1 | 4/2009 | Daynes |
| 7,685,183 B2 | 3/2010 | Pace |
| 7,818,721 B2 | 10/2010 | Sundararajan |
| 7,950,004 B2 | 5/2011 | Vieira |
| 7,957,934 B2 | 6/2011 | Greifeneder |
| 7,992,133 B1 | 8/2011 | Theroux |
| 7,992,134 B2 | 8/2011 | Hinchey |
| 8,032,872 B2 | 10/2011 | Violleau |
| 8,037,458 B2 | 10/2011 | Shekov |
| 2001/0004766 A1 | 6/2001 | Koyama |
| 2002/0032754 A1 | 3/2002 | Logston |
| 2002/0174415 A1 | 11/2002 | Hines |
| 2002/0199173 A1 | 12/2002 | Bowen |
| 2003/0056200 A1 | 3/2003 | Li |
| 2004/0010570 A1 | 1/2004 | Kaler |
| 2004/0093588 A1 | 5/2004 | Gschwind |
| 2005/0039171 A1 | 2/2005 | Avakian |
| 2005/0039172 A1 | 2/2005 | Rees |
| 2005/0039186 A1 | 2/2005 | Borkan |
| 2005/0039187 A1 | 2/2005 | Avakian |
| 2005/0039190 A1 | 2/2005 | Rees |
| 2005/0086656 A1 | 4/2005 | Whitlock |
| 2005/0223367 A1 | 10/2005 | Smith |
| 2005/0278706 A1 | 12/2005 | Garza |
| 2005/0283522 A1 | 12/2005 | Parkkinen |
| 2006/0069682 A1 | 3/2006 | Fanous |
| 2006/0271395 A1 | 11/2006 | Harris |
| 2006/0271542 A1 | 11/2006 | Harris |
| 2006/0271575 A1 | 11/2006 | Harris |
| 2006/0271930 A1 | 11/2006 | Letizi |
| 2006/0271931 A1 | 11/2006 | Harris |
| 2007/0011667 A1 | 1/2007 | Subbiah |
| 2007/0069005 A1 | 3/2007 | Dickerson |
| 2007/0088762 A1 | 4/2007 | Harris |
| 2007/0143323 A1 | 6/2007 | Vanrenen |
| 2007/0143743 A1 | 6/2007 | Cobb |
| 2007/0169055 A1 | 7/2007 | Greifeneder |
| 2007/0180439 A1 | 8/2007 | Sundararajan |
| 2008/0276227 A1 | 11/2008 | Greifeneder |
| 2008/0288212 A1 | 11/2008 | Greifeneder |
| 2008/0288962 A1 | 11/2008 | Greifeneder |
| 2009/0049429 A1 | 2/2009 | Greifeneder |
| 2009/0157359 A1* | 6/2009 | Chernoff ................ 702/186 |
| 2009/0287729 A1* | 11/2009 | Chen et al. ............. 707/102 |

OTHER PUBLICATIONS

Prabhu et al, "Using thread level speculation to simplify manual parallelization," ACM PPoPP, pp. 1-12, 2003.

Ntarmos et al, "Distributed hash sketches: scalable efficient and accurate cardinality estimation for distributed multisets," ACM Trans. on Comput. Sys. vol. 27, No. 1, article 2, pp. 1-52, 2009.

Olivier et al, "Scheduling task parallelism on multi socket multicore systems", ACM ROSS, pp. 49-56, 2011.

Andrew Z. Tabona, Windows 2003 performance monitor, p. 1-8, Publish Mar. 29, 2004.

Mikhail Dmitriev, "Design of JFluid: A Profiling Technology and Tool Based on Dynamic Bytecode Instrumentation," Sun Microsystems, 2003, <http://delivery.acm.org/10.1145/1700000/1698171/smli_tr-2003-125.pdf> pp. 1-22.

Mikhail Dmitriev, "Selective Profiling of Java Applications Using Dynamic Bytecode Instrumentation," IEEE, 2004, <http://ieeexplore.ieee.org/stamp/stamp.jsp?tp=&arnumber=1291366> pp. 141-151.

Parker Abercrombie et al., "jContractor: Bytecode Instrumentation Techniques for Implementing Design by Contract in Java", UCSB, Aug. 2004, <http://jcontractor.sourceforge.net/doc/jContractor_RV02.pdf> pp. 1-25.

Metadata API Overview, dated May 27, 2006, URL: http://msdn.microsoft.com/enus/library/ms404434.

* cited by examiner

METHODS AND SYSTEM FOR GLOBAL REAL-TIME TRANSACTION TRACING

BACKGROUND OF THE INVENTION

Acquisition of application performance data is an important but difficult task because efforts to gather the performance data may change the behavior of the monitored application, which, in turn, also affects the acquired performance data. In a possible worst case, performance monitoring may cause a malfunction or even a crash of the application. Current bytecode instrumentation based performance monitoring tools provide performance data at a fine-grained level (e.g., down to data describing single method calls). Information at this detailed level is powerful for quickly and efficiently finding and eliminating performance problems. Acquisition of such high-quality information requires the placement of a large quantity of bytecode instrumentations for performance monitoring into the bytecode of the monitored application. The monitoring sensors also create a large amount of measurement data that has to be aggregated and analyzed.

Further, monitoring of globally-distributed applications requires transfer of original bytecode and instrumented bytecode over network connections. This process may be aided and enhanced by compression and/or encryption of the bytecode. However, it is subject to bottlenecks, both caused by network connections and the instrumentation process. For example, an unreliable or failed network connection can stall the instrumentation process.

SUMMARY OF THE INVENTION

Example embodiments of the present invention are directed to systems and methods for software application performance monitoring, such as monitoring large applications which may be globally distributed and containing distributed application components which may communicate using non-secured, low-bandwidth network connections. Further, example embodiments of the present invention provide methods for reducing overall network bandwidth required for bytecode instrumentation and for secure tracing of transactions over non-secured and slow network connections without adding overhead for encryption or compression of transaction trace data to the monitored application.

Example embodiments of the present invention decouple the processes of measurement acquisition through sensor execution, instrumentation by augmenting bytecode with sensor bytecode, and sending and buffering measurement events and correlation of measurements. This decoupling allows measurement events to be packetized and optionally encrypted or compressed to enable communication with a monitoring node using slow and non-secured network connections. Further, multiple parallel instrumentation engines in collector nodes eliminate the possible instrumentation bottleneck presented by one, centralized instrumentation engine in a single server. Moreover, decentralized buffering of monitoring event data allows management of peak measurement loads on the monitoring node.

An example embodiment of the present invention is a method of instrumenting original code of an application for monitoring. The method comprises receiving instrumentation rules associated to portions of an application to be instrumented for monitoring of the application. The original code for the application is received from an application node and is instrumented in accordance with the instrumentation rules to produce instrumented code. The instrumented code is transferring to the application node for operation. Event data produced from operation of the instrumented code of the application on the application node is received and transferred to a monitoring node for correlation at the monitoring node.

In certain embodiments, a plurality of applications to be operated on respective application nodes may be instrumented. Further, the method may operate on a plurality of collector nodes, with each collector node transferring the event data to the monitoring node and receiving instrumentation rules from the monitoring node. The method thereby provides both decentralized instrumentation of a plurality of applications operating on respective application nodes and centralized management of the instrumentation of the plurality of applications operating on the respective application nodes, thereby enabling parallel instrumentation of multiple applications.

In certain embodiments in which the instrumentation rules are received from a monitoring node and during an initial operation of the application at the application node and prior to receiving the instrumentation rules from the monitoring node, metadata may be extracted from the original code and transferred to the monitoring node.

In other certain embodiments, event data may be buffered prior to transferring the event data to the monitoring node for correlation, thereby minimizing runtime burden of operation of the application on the application node and allowing the event data to be transferred to the monitoring node over unreliable networks and low-bandwidth networks. Further, event data may be encrypted or compressed prior to transferring the event data to the monitoring node for correlation, thereby eliminating runtime burden of encrypting or compressing the event data during operation of the application on the application node. Event data may be correlated at the monitoring node in accordance with a tag identifying the application that produced the event data.

Another example embodiment of the present invention is a method of transferring instrumentation rules, receiving event data and correlating the event data. The method includes transferring instrumentation rules associated to portions of an application to a collector node for monitoring of the application, the application having original code to be instrumented at the collector node in accordance with the instrumentation rules. Event data produced from operation of the instrumented code of the application at an application node is received from the collector node and correlated. The correlated event data is then output for analysis. Event data may be correlated in accordance with a tag identifying the application that produced the event data.

In certain embodiments, a plurality of applications to be operated on respective application nodes may be instrumented. Further, event data may be received and correlated from a plurality of collector nodes. The method thereby provides both decentralized instrumentation of a plurality of applications operating on respective application nodes and centralized management of the instrumentation of the plurality of applications operating on the respective application nodes, thereby enabling parallel instrumentation of multiple applications. The decentralized instrumentation and centralized management minimize runtime burden of operation of the applications on the respective application nodes, ease configuration of distributed monitoring systems via centralized instrumentation configuration via instrumentation rules, allow encryption or compression of instrumentation rules prior to transferring the instrumentation rules to the collector node, and allow decryption or decompression of the event data received from the collector node.

In certain embodiment, during an initial operation of the application at the application node and prior to transferring the instrumentation rules to the collector node, the method includes receiving, from the collector node, metadata extracted from the original code and presenting, to a user, configuration operations regarding classes and methods available in the application for generating the instrumentation rules.

A further example embodiment is a method of operating instrumented code of an application. The method includes transferring original code for an application, including an identifier unique to the instance of the application, to a collector node. Instrumented code is received from the collector node for operation instrumented in accordance with instrumentation rules associated to portions of the application. The instrumented code of the application is operated, thereby producing event data that is transferred to the collector node.

In certain embodiments, loading of the original code of the application is intercepted prior to transferring the original code. The instrumented code may include sensors inserted in the original code of the application. An event record may be created with an identifier unique to a sensor for each sensor execution during operation of the instrumented code. Measurement data may be retrieved from the sensor and stored in the even record, with the event record stored to a fixed-size event buffer. Even records available in the fixed-size buffer may be sent cyclically and asynchronously to operation of application code to the collector node and deleted from the fixed-size buffer.

Another example embodiment of the present invention is a method performed in a system comprising at least one application node, at least one collector node and a monitoring node. At the collector node, instrumentation rules associated to portions of the application to be instrumented for monitoring of the application are received. Original code for an application is transferred from the application node to the collector node. The original code of the application is received at the collector node and instrumented in accordance with the instrumentation rules to produced instrumented code. The instrumented code is then transferred to the application node where it is operated. Event data is produced at the application node from operation of the instrumented code of the application and is transferred to the collector node. At the collector node, the even data is received and transferred to the monitoring node where it is received, correlated and output for analysis. Correlating may include correlating an event record and sensor metadata with existing event records in an event collector and storing the correlation result in a measurement buffer. Further, the instrumentation rules may be encrypted or compressed at the monitoring node and decrypted or decompressed at the collector node prior to storing them at the collector node.

In certain embodiments, transferring the original code for the application to the collector node includes, at the application node, triggering an agent deployed in the application to intercept loading of the original code and, at the collector node, extracting from a connection request an identifier unique to the instance of the application and creating a copy of the instrumentation rules unique to the identifier. Further, instrumenting the original code of the application may include analyzing the original code of the application to extract and store metadata of the original code in a metadata repository, selecting methods to instrument in accordance with the instrumentation rules, fetching instrumentation rules specific to the agent identifier and inserting sensors in the original code of the application to produce instrumented code for operation. Inserting sensors in the original code of the application may include creating a sensor metadata record with an identifier unique to the sensor, initializing the sensor metadata record with the extracted metadata, setting a flag indicating whether the metadata has been sent to the monitoring node, inserting the sensor metadata record into the metadata repository of the collector, selecting sensor code matching the sensor metadata and parameterizing it with the unique sensor identifier, and injecting the parameterized sensor code into the original code to produce instrumented code.

In other embodiments, operating the instrumented code of the application may include creating an event record with an identifier unique to the sensor for each sensor execution during operation of the instrumented code, retrieving measurement data from the sensor and storing it in the event record, storing the event record to a fixed-size event buffer, and cyclically and asynchronously to operation of application code sending event records available in the fixed-size buffer to the collector node and deleting the sent event records from the fixed-size buffer.

Further, in certain embodiments, transferring the event data to the monitoring node may include extracting from the event data an identifier unique to a sensor that produced the event data, querying an instrumentation metadata repository for a sensor metadata record matching the identifier and determining whether a flag is set in the sensor metadata record indicating that the metadata has not been sent to the monitoring node. If the flag is set, the method further includes sending the sensor metadata record to the monitoring node, clearing the flag, and sending the event data to the monitoring node.

Moreover, receiving the event data from the collector node may include extracting from an event record an identifier unique to a sensor that produced the event record, and querying an instrumentation metadata repository with the sensor identifier for sensor metadata. Further, if the sensor metadata is found, the method includes forwarding the event record and the sensor metadata record to a correlation engine.

In further embodiments, receiving the event data from the collector node includes extracting a class key from a sensor metadata record and querying a metadata repository for a class metadata record with the class key. If the class metadata record is not found, the method further includes fetching the class metadata record and associated method metadata records from the collector node and inserting the class metadata record and method metadata records into the metadata repository. The sensor metadata record is then inserted into the metadata repository.

In other embodiments, fetching the class metadata record and associated method metadata records may include querying the metadata repository with the class key for the class metadata record and method metadata records, and transferring the class metadata record and method metadata records to the monitoring node.

In other embodiments, received original code may be stored in a repository, together with a class key, allowing association of the original code with a class. The stored original code may be used to perform instrumentation updates during application runtime, according to received instrumentation rule update requests. Instrumentation updates may include adding instrumentation code to already original code or to already instrumented code, to restore original code or to remove instrumentation from instrumented code.

BRIEF DESCRIPTION OF THE DRAWINGS

The foregoing and other objects, features and advantages of the invention will be apparent from the following more particular description of embodiments of the methods and apparatus for a Distributed Transaction Monitoring System, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

DETAILED DESCRIPTION OF THE INVENTION

A description of example embodiments of the invention follows.

Bytecode is a general term describing intermediate programming languages used by virtual machines (e.g., Java Virtual Machine) for interpretation or just-in-time compilation. Common examples of bytecode are Java bytecode and Common Intermediate Language (CIL) bytecode. Bytecode-based software platforms, such as Java by Sun Microsystems of Santa Clara, Calif. and .NET Framework by Microsoft Corporation of Redmond, Wash. provide interfaces to intercept class loading events and to alter the bytecode of the loaded class before it is loaded into memory. Additionally these frameworks enable restricted altering of bytecode that is already loaded into the runtime environment. Open and documented bytecode formats enable analysis of bytecode and selective altering of the bytecode. These features enable the creation of monitoring systems that instrument application code with performance monitoring data on the fly, without the need to alter application source code. Such systems ease the task of application performance monitoring because relatively little preparation of the monitored application is required. On the other hand, such monitoring systems create significant monitoring-related overhead (e.g., processing time required to perform bytecode instrumentation and storage of acquired measurement data inside the monitored application).

Figure 1:
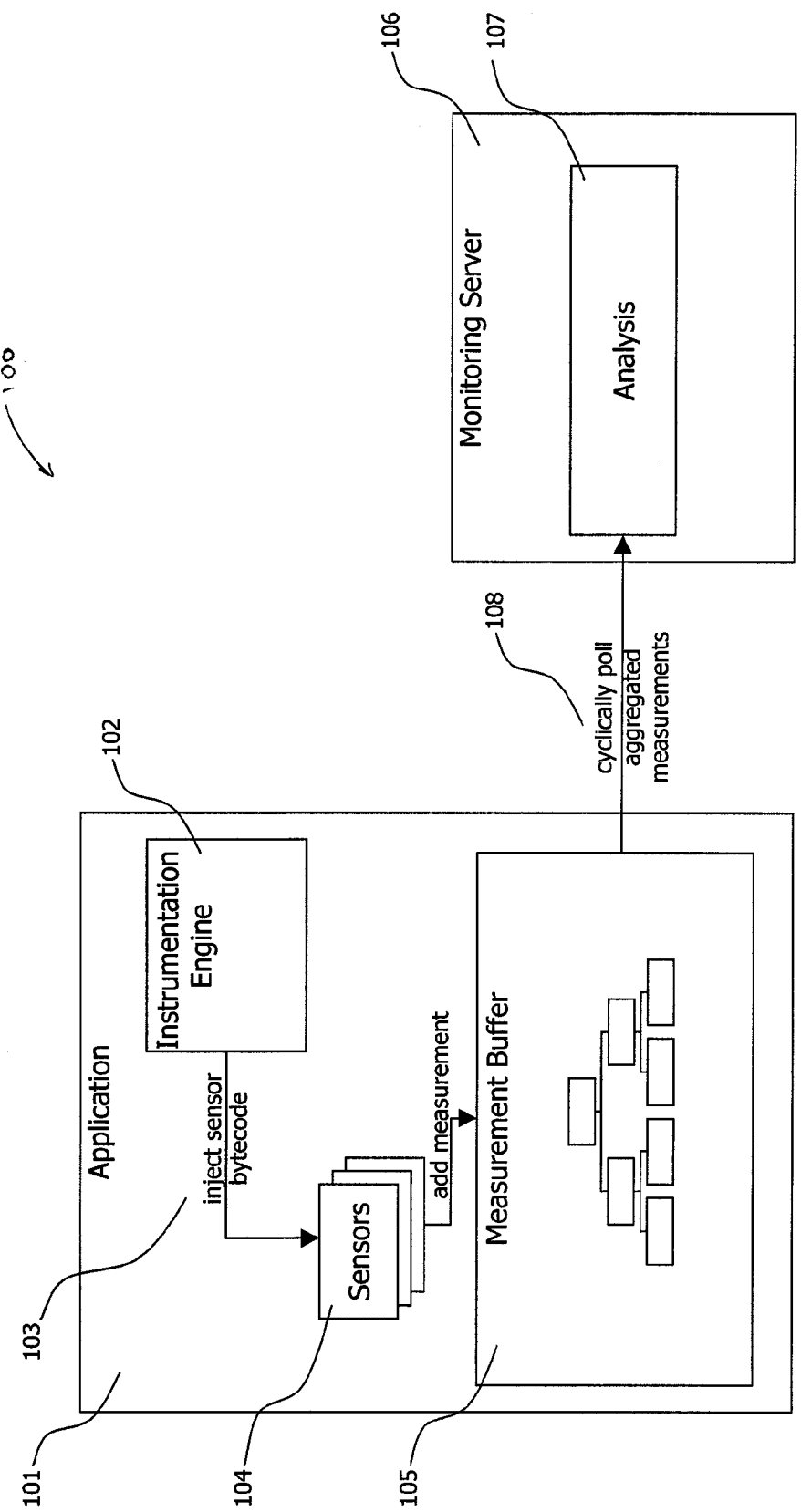
FIG. 1 is a blocking diagram illustrating a monitoring system using in-application instrumentation of sensors and storage and aggregation of measurement data.

FIG. 1 is a block diagram illustrating a monitoring system 100 using in-application instrumentation of sensors, storage and aggregation of measurement data. An application 101 loads an instrumentation engine 102, which injects sensor bytecode 103 into application code. The injected sensors 104 generate measurement data, which is aggregated in a measurement buffer 105 residing in the process of the monitored application 101. An external monitoring server 106 with an analysis module 107 cyclically polls the measurement buffer 105 to obtain data for performance analysis.

This approach is subject to various shortcomings. First, the instrumentation engine 102, which is deployed to the application 101, must provide functionality to parse and analyze bytecode of the application 101 and to inject sensor bytecode 103 into bytecode of the application 101. Code representing this functionality must be deployed to and executed in the monitored application 101. Additionally, the bytecode representing all sensors 104 must be known by the instrumentation engine 102 and, thus, must also be deployed to the application 101. These requirements result in a resource-intensive instrumentation engine 102 that performs all instrumentation tasks within the process of the monitored application 101, thereby generating significant processing overhead.

Further, the measurement buffer 105, which resides in the memory of the monitored application 101, is another source of overhead because the measurement buffer 105 requires a considerable amount of memory. Additionally, the measurement buffer 105 may cause erroneous behavior of the monitored application 101 (e.g., including an application crash) because peak memory consumption of the measurement buffer 105 is not predictable. If the load handled by the application 101 increases, the amount of memory required by the measurement buffer 105 also rises as the increased load causes more activity of the monitored application 101. This, in turn, causes more acquired measurement data to be loaded into the measurement buffer 105. The increased memory consumption caused by the measurement buffer 105 may, in a worst case, lead to a crash of the application 101 due to, for example, an out of memory error.

Moreover, although the monitoring server 106 cyclically reads out measurements 108 and clears the measurement buffer 105, the probability of an application crash caused by a growing measurement buffer 105 cannot be excluded. Increasing the polling frequency of the monitoring server 106 may reduce the possibility of an application crash, but it cannot eliminate the possibility of an application crash caused by monitoring overhead. An alternative solution that limits the memory consumption caused by the monitoring processes to a predictable maximum is needed.

Figure 2:
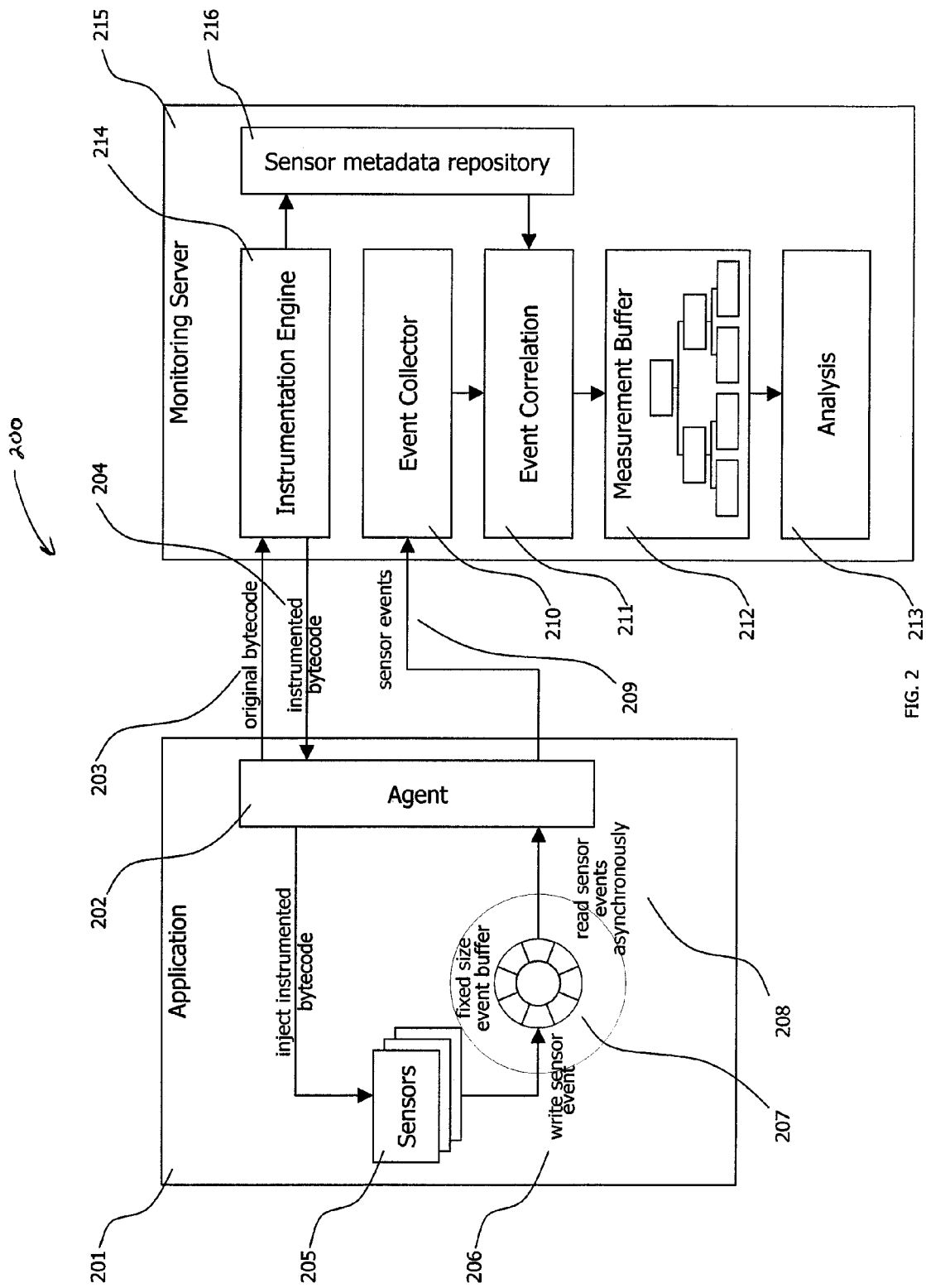
FIG. 2 is a block diagram illustrating a monitoring system using out-of-application instrumentation of sensors and storage and aggregation of measurement data.

FIG. 2 is a block diagram illustrating a monitoring system 200 using out-of-application instrumentation of sensors and storage and aggregation of measurement data. This solution to the problems presented above moves measurement data storage and bytecode instrumentation out of the process of a monitored application 201 and into a centralized monitoring server 215. An agent 202 deployed to the application 201 monitors and intercepts loading of bytecode, captures the original bytecode 203 and sends the original bytecode 203 to the monitoring server 215 for instrumentation. The monitoring server 215 forwards the original bytecode 203 to an instrumentation engine 214 that parses the original bytecode 203 to extract metadata from the original bytecode 203 and injects sensors 205 into the original bytecode 203. The metadata, which allows identification of injected sensors and measurement data generated by those sensors, is inserted into a sensor metadata repository 216. Instrumented bytecode 204 is then sent back to the agent 202, which forwards it to the virtual machine to finalize loading of bytecode. The instrumented bytecode 204 is loaded by the application 201 instead of the original bytecode 203, and the injected sensors 205 start monitoring application performance.

The agent 202 additionally provides a fixed-size event buffer 207, which may be implemented as a ring buffer, to temporarily buffer measurement data generated by sensors 205 in the application 201. Sensors 205 acquire measurement data and encapsulate it in sensor events, together with sensor context identification data required to reconstruct the context of the sensor 205 that generated the sensor event. The generated sensor event is written 206 into the ring buffer 207. The agent 202 cyclically and asynchronously to execution of application bytecode reads out 208 the events from ring buffer 207. The buffered sensor events are then sent 209 to the monitoring server 215. The monitoring server 215 forwards received sensor events to an event collector 210, which forwards the sensor events to an event correlation module 211. The event correlation module 211 uses sensor context identification data contained in the received sensor events 209 to correlate measurement data in the sensor events with sensor metadata stored in the sensor metadata repository 216 to reconstruct the semantics of the received measurement data. The correlated measurement data is placed in a measurement buffer 212 that is used by an analysis module 213 to analyze received measurement data.

This monitoring system 200 reduces monitoring-related overhead within the monitored application 201. However, it may produce considerable network traffic between the application 201 and the monitoring server 215 because (1) original bytecode 203 is transferred from the monitored application to the centralized monitoring server for instrumentation, and (2) the instrumented bytecode 204 is transferred back to the monitored application. For globally deployed applications existing in distributed components connected by non-secured, low-bandwidth network connections, the available bandwidth and lack of security are not sufficient to support current transaction monitoring systems.

Therefore, a solution is needed that allows keeping monitoring-related network traffic low and localized, and that allows encrypting and/or compressing the monitoring-related data so that it may be sent over non-secured and low-bandwidth network connections, without increasing monitoring-related overhead in the monitored application.

Figure 3:
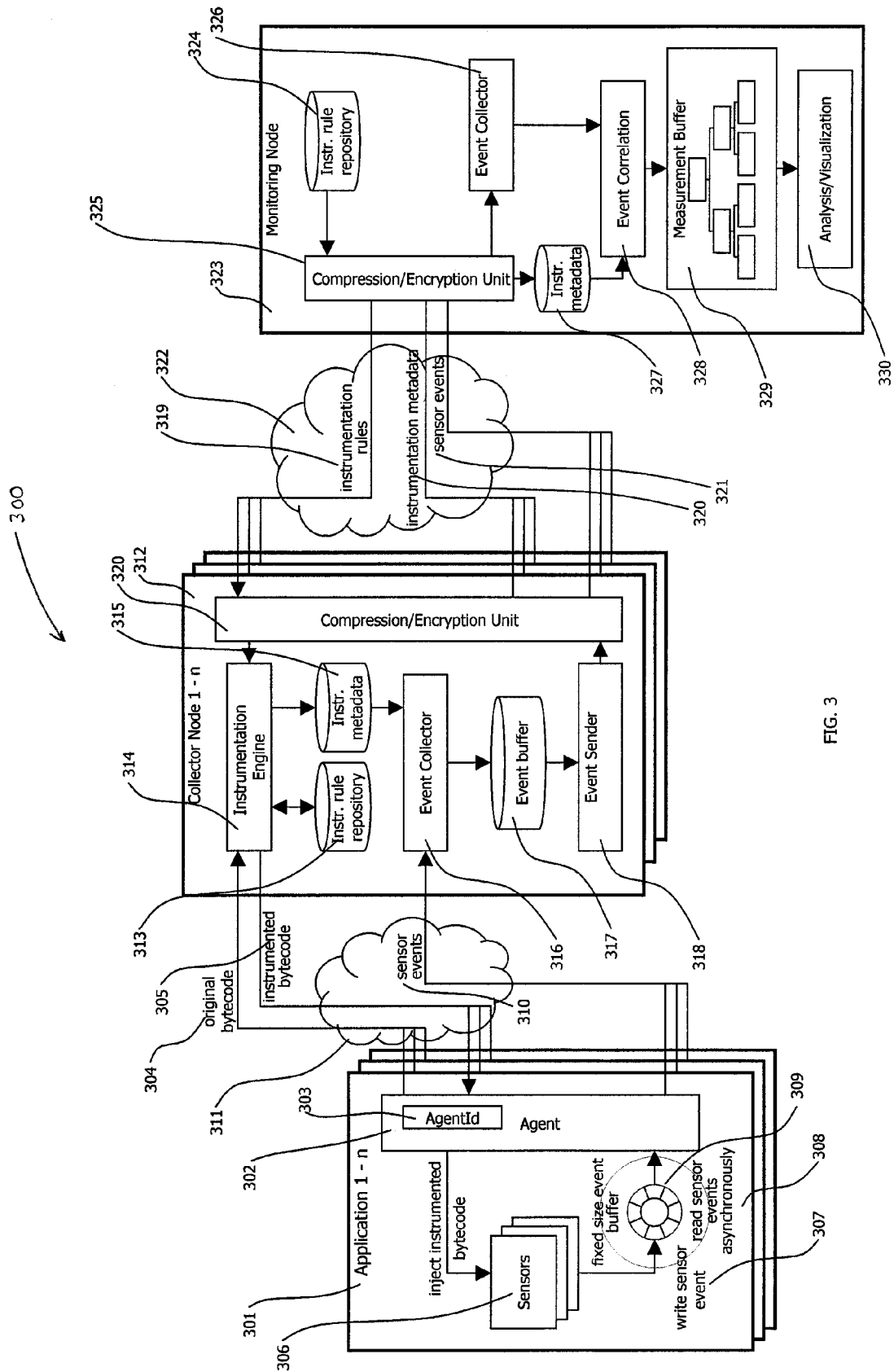
FIG. 3 is a block diagram illustrating an example embodiment of the present invention using out-of-application instrumentation of sensors and storage and aggregation of measurement data by a plurality of collector nodes to decouple bytecode instrumentation and event handling from event correlation by a monitoring node.

FIG. 3 is a block diagram illustrating a monitoring system 300 according to an example embodiment of the present invention using out-of-application instrumentation of sensors. The system 300 performs instrumentation of application bytecode, and intermediate buffering/storage and aggregation of performance measurement data, outside of the monitored application in an intermediate node called a collector node 312. Further, a central monitoring node 323 may be connected to a plurality of collector nodes 312 to provide information to the plurality of collector nodes 312 to control bytecode instrumentation and receive measurement data from the plurality of collector nodes 312. The plurality of collector nodes 312 decouples bytecode instrumentation and event handling of a plurality of applications 301 from event correlation by the central monitoring node 323. It is noteworthy that the example embodiment described above allows deployment of multiple collector nodes 312 for one monitoring node 323, allowing parallel operation of multiple instrumentation engines 314, thereby considerably increasing the performance of bytecode instrumentation processes.

Network connections 311 between collector nodes 312 and applications 301 may be secured network connections providing high bandwidth (e.g., a typical LAN connection). In a preferred embodiment, a collector node 312 is typically deployed within a network environment local to the monitored application 301. The collector nodes 312 and the central monitoring node 323 may be connected using network connections 322 that are non-secured and providing a lower bandwidth (e.g., a typical WAN connection). Further, communications between collector nodes 312 and the monitoring node 323 may use encryption and/or compression without burdening the process of the monitoring application 301, and thus are suitable for non-secured, low-bandwidth network connections.

Figure 4:
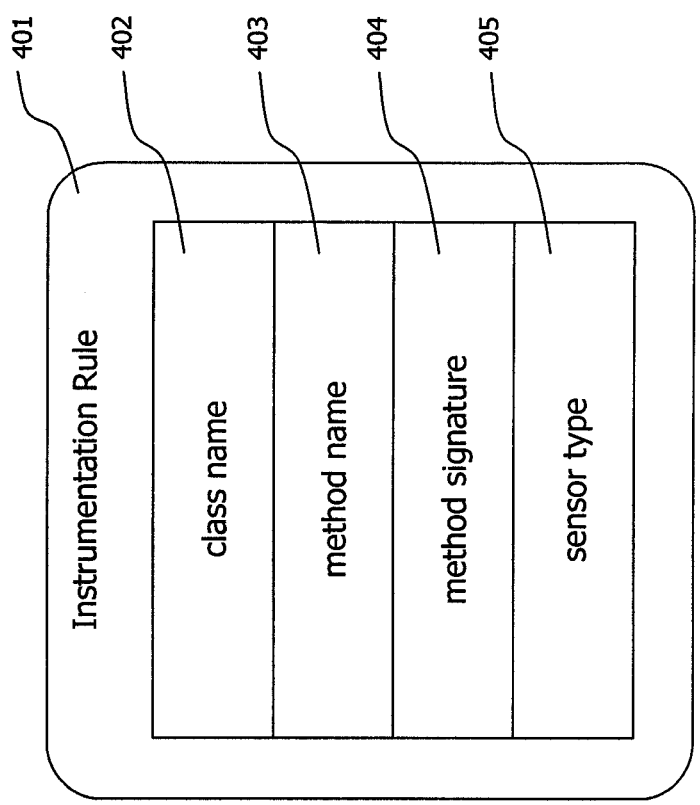
FIG. 4 is a block diagram illustrating an instrumentation rule record.

The monitoring node 323 maintains an instrumentation rule repository 324 that contains a set of instrumentation rules (e.g., instrumentation rules 401 of FIG. 4). An instrumentation rule 401 provides information regarding which parts of the bytecode of a monitored application should be instrumented with which type of sensor 306. During an initial connection between a collector node 312 and a monitoring node 323, the monitoring node sends the instrumentation rules 319 in its instrumentation rule repository 324 to the collector node 312, optionally using its compression/encryption unit 325 to compress and/or encrypt the data to be sent. The collector node 312 receives the instrumentation rules 319 sent by the monitoring node 323 and optionally decompresses and/or decrypts them in its compression/encryption unit 320 and stores them in its instrumentation rule repository 313. Changes to the monitoring node's instrumentation rule repository 324 performed while collector nodes 312 are connected are also mirrored to the connected collector nodes 312.

On startup of an application 301 with a deployed agent 302, the agent 302 connects to a collector node 312. The collector node 312 then creates an agent-specific instrumentation rule set (e.g., agent-specific instrumentation rule set 502 of FIG. 5) in the collector node's instrumentation rule repository 313, which is used to control bytecode instrumentation for the application 301. The agent-specific instrumentation rule set 502 is tagged with an agentId 303 of the application 301 to which the agent 302 is deployed. The agentId 303 is a unique identifier of a specific agent 303 instance and, thus, also identifies a specific application 301 instance.

Bytecode loading initialized by the application 301 is intercepted by the agent 302, which sends original bytecode 304 of the application 301 to the collector node 312 for instrumentation. The collector node 312 forwards the received original bytecode 304 to an instrumentation engine 314, which determines the matching agent-specific instrumentation rule set 502 matching the agentId 303 of the agent 302 that sent the bytecode 304. After the instrumentation engine 314 has transformed the original bytecode 304 into instrumented bytecode 305 according to the instrumentation rules 319 in the agent specific instrumentation rule set 502, the instrumented bytecode 305 is sent back to the agent 302 which, in turn, forwards it to the bytecode loading process of the application 301, thereby loading the instrumented bytecode 305 instead of the original bytecode 304.

The instrumentation engine 314 extracts metadata from the original bytecode 304 during the instrumentation process and stores it in an instrumentation metadata repository 315 of the collector node 312. Extracted metadata may include, for example, information about the name of a class, the names and signatures of methods of a class, and sensorIds and types of sensors 306 that are injected into the original bytecode 304 (as described below with reference to FIGS. 7A-7C and 11). The extracted metadata is stored in the instrumentation metadata repository 315 in a way that metadata relevant for a sensor 306 can be identified by a sensorId (e.g., sensorId 702 of FIG. 7A). The injected bytecode for a sensor 306 is parameterized in away that events generated by the sensor 306 contain an individual sensorId 702 for each injected sensor. The sensorId 702 is unique within all sensors 306 on all applications 301 connected to all collector nodes 312 that are connected to a monitoring node 323.

On execution of instrumented bytecode 305 by the application 301, bytecode of sensors 306 is executed, which may perform various performance relevant measurements including, for example, measurements of method execution times, processor times required to execute methods, or synchronization times required for method execution. Execution of the sensors 306 creates sensor events representing the acquired performance measurement data, and inserts those sensor events 307 into a fixed-size event ring buffer 309. The sensor events in the fixed-size event ring buffer 309 are read out 308 by the agent 302 asynchronously to execution of application 301 and sensor 306 byte code. The agent 302 sends the sensor events 310 to the collector node 312 to which the agent 302 is connected.

The collector node 312 receives the sensor events 310 and forwards the received events 310 to its event collector 316, which inserts the events 310 as sensor event records (e.g., sensor event record 601 of FIG. 6) into its event buffer 317. An event sender 318 cyclically sends the sensor event records 321 accumulated in the event buffer 317 to the monitoring node 323, optionally compressing and/or encrypting them in the compression/encryption unit 320. Collector nodes 312 may communicate with the monitoring node 323 regarding event buffer 317 availability. Depending on the event buffer 317 availability and information received by the monitoring node 323 from the collector nodes 312, the monitoring node 323 may choose to "mute" collector nodes 312 with sufficient available event buffer 317 space to accept event records 321 from collector nodes 312 with inadequate event buffer 317 availability.

Before a sensor event record 321 is sent to the monitoring node 323, the instrumentation metadata repository 315 is queried for a sensor metadata record (e.g., sensor metadata record 701 of FIG. 7) where the sensorId 702 of the sensor metadata record 701 is equal to the sensorId (e.g., sensorId 602 of FIG. 6) of the sensor event record 601 which is going to be sent. If a sensor metadata record 701 is found, and a dirty flag (e.g., dirty flag 707 of FIG. 7) indicates that the sensor metadata record 701 has not yet been sent to the monitoring node 323, the respective sensor metadata record 320 is sent to the monitoring node 323 prior to sending the sensor event record 321. Sensor metadata records 320 may be compressed and/or encrypted in the compression/encryption unit 320 before they are sent to the monitoring node 323. This "lazy" sending of sensor metadata records 320 ensures that only sensor metadata records 320 that are required to be sent to the monitoring node 323 are sent (i.e., those that have not yet been sent). The monitoring node 323 receives the optionally-sent sensor metadata records 320 and stores them in its instrumentation metadata repository 327, optionally decompressing and/or decrypting the sensor metadata records 701 in its compression/encryption unit 325.

Upon receiving sensor event records 321, the monitoring node 323 decompresses and/or decrypts the received sensor event records 321 and forwards them to its event collector 326. The event collector 326 forwards the sensor event records 321 to the event correlation module 328, which correlates the incoming sensor event record 321 with previously-received sensor event records. The event correlation module 328 also queries sensor metadata records 701, method metadata records (e.g., method metadata record 711 of FIG. 7) and class metadata records (e.g., class metadata record 721 of FIG. 7) required for correlation and further analysis from the instrumentation metadata repository 327. It should be noted that method metadata records 711 and class metadata records 721, extracted from the original bytecode 304 on the collector node 312 and stored in its instrumentation metadata repository 315, may be requested from the monitoring node 323 on demand, ensuring that only method metadata records 711 and class metadata records 721, which are required on the monitoring node 323 for correlation and analysis, are transferred from the collector node 312 to the monitoring node 323.

Correlation of sensor event records 321 may include, for example, correlating sensor event records 321 describing method exits with the sensor event records 321 describing the respective method entries to calculate performance data of a single method call, or correlating multiple sensor event records 321 describing multiple nested method calls into a method call stack. After the incoming sensor event records 321 are correlated by the event correlation module 328, the resulting measurements are stored in a measurement buffer 329 and are available for further processing by an analysis and visualization unit 330.

FIG. 4 is a block diagram illustrating an instrumentation rule record 401, which contains data that may be used by an instrumentation engine (e.g., instrumentation engine 314 of FIG. 3) to select fractions of original bytecode (e.g., original bytecode 304 of FIG. 3) that should be augmented with sensor (e.g., sensor 306 of FIG. 3) bytecode. As illustrated, an instrumentation rule record 401 may include, for example, a class name 402 to filter fractions of original bytecode 304 representing a class of a specific name, a method name 403 to filter byte code fractions representing methods of a specific name, and a method signature specification 404 to filter methods according to their input and output parameters. It should be noted that instrumentation rule records 401 also may use other mechanisms to identify fractions of original bytecode 304, such as the annotation system included in the Java programming language. Additionally, an instrumentation rule record 401 contains a sensor type indicator 405 defining the type of sensor 306 that should be augmented to matching fractions of original bytecode 304. Sensor types may include, but are not limited to, sensors measuring method execution time and the size of input or output parameters and sensors measuring synchronization time included in method execution time, or sensors capturing values of input and output parameters.

Figure 5:
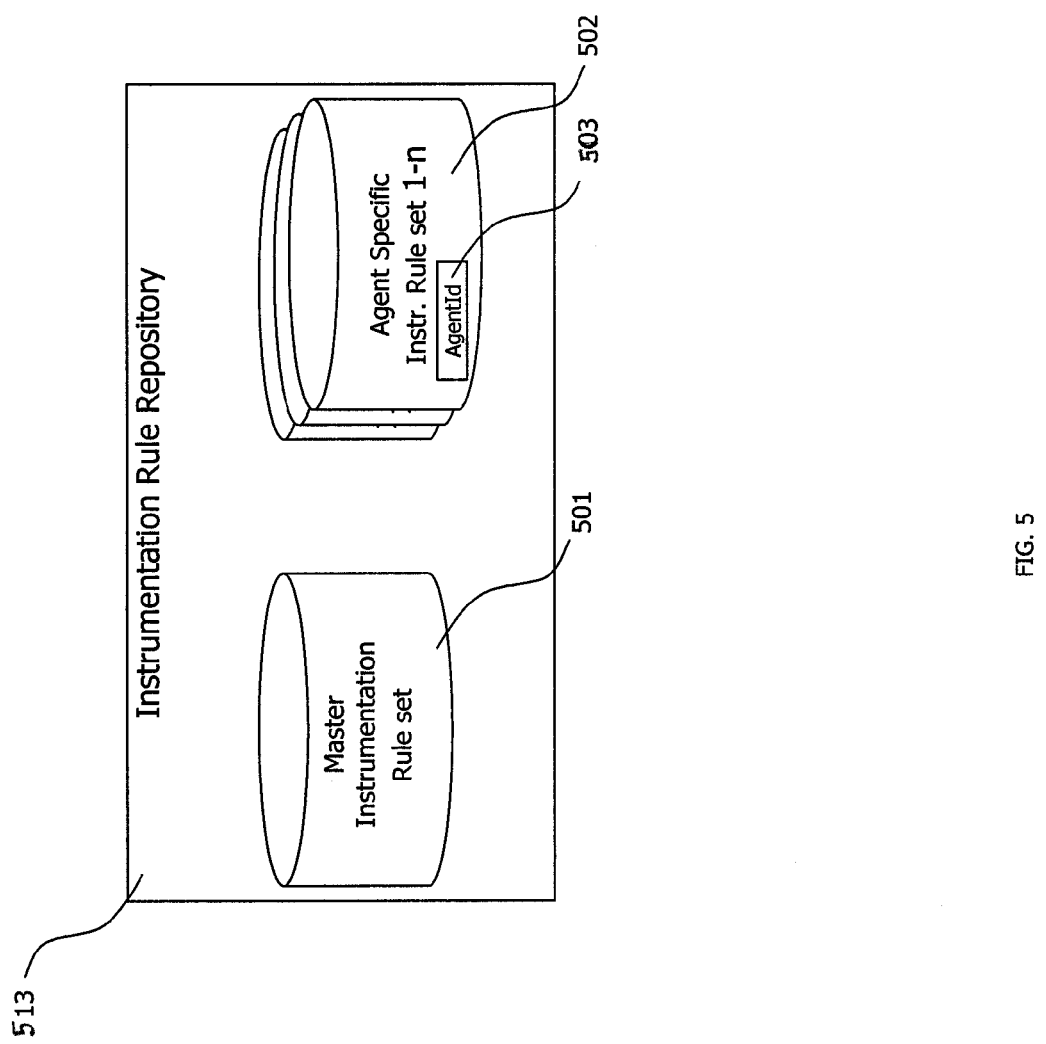
FIG. 5 is a block diagram illustrating an instrumentation rule repository of a collector containing a master instrumentation rule set and a plurality of per-agent instrumentation rule sets.

FIG. 5 is a block diagram illustrating an instrumentation rule repository 513 (e.g., instrumentation rule repository 313 of FIG. 3) of a collector node (e.g., collector node 312 of FIG. 3) containing a master instrumentation rule set 501 and a plurality of agent-specific instrumentation rule sets 502. The master instrumentation rule set 501 holds the same content as the monitoring node's instrumentation rule repository (e.g., instrumentation rule repository 324 of FIG. 3). The agent-specific instrumentation rule sets 502 preserve states of the master instrumentation rule set 501 available at connection times of agents (e.g., agents 302 of FIG. 3), and are tagged with an agentId 503 (e.g., agentId 303 of FIG. 3) of the respective agents. The instrumentation engine (e.g., instrumentation engine 314 of FIG. 3) uses the agent-specific instrumentation rule set 502 with matching agentId 303 to perform instrumentation on a specific agent instance 302. This guarantees that one application (e.g., application 301 of FIG. 3) is instrumented using a consistent instrumentation rule set 502 from connection of the agent 302 until it is disconnected or the monitored application 301 is shut down.

Figure 6:
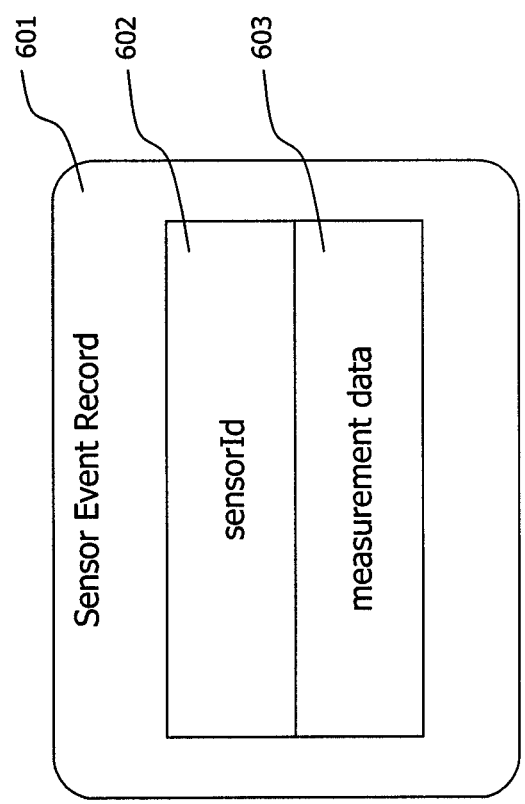
FIG. 6 is a block diagram illustrating an event record.

FIG. 6 is a block diagram illustrating an event record 601, which is used to convey measurement data acquired by instrumented sensors (e.g., sensors 306 of FIG. 3) from the application (e.g., application 301 of FIG. 3), via a collector node (e.g., collector node 312 of FIG. 3), to a monitoring node (e.g., monitoring node 323 of FIG. 3) for correlation and analysis. The event record 601 includes a sensorId 602 and measurement data 603. The sensorId field 602 uniquely identifies the sensor 306 that generated the event record 601 and is used to correlate the measurement data included in the event record 601 with metadata describing the sensor 306 that generated the event record 601. The measurement data 603 contains the measurement value acquired by an instrumented sensor 306 at a specific measurement. Example measurement data includes, for example, execution counters reflecting the number of times a method or function has been executed, captured argument values of a specific method or function invocation, CPU time required for a specific invocation, and execution duration of a specific method or function invocation.

Figures 7A, 7B, 7C:
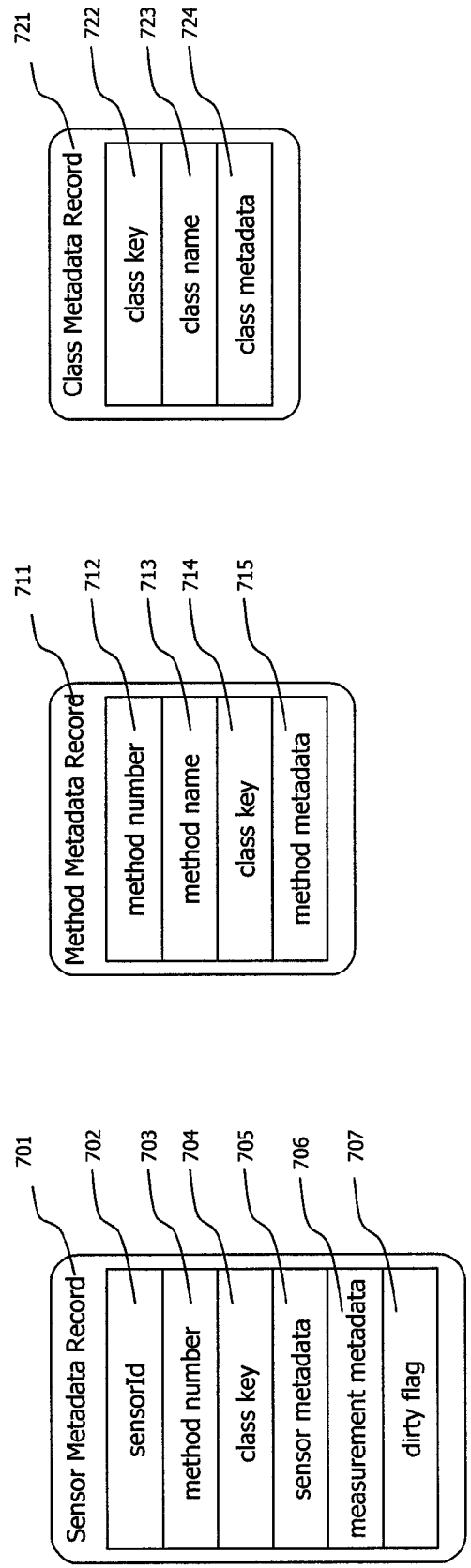
FIGS. 7A-7C are block diagrams illustrating a sensor metadata record, a method metadata record and a class metadata record, respectively.

FIGS. 7A-7C are block diagrams illustrating three types of instrumentation metadata records: a sensor metadata record 701, a method metadata record 711 and a class metadata record 721, respectively. Multiple sensor metadata records 701 may be assigned to a method metadata record 711, and multiple method metadata records 711 may be assigned to a class metadata record 721.

As illustrated in FIG. 7A, a sensor metadata record 701 includes a sensorId 702 that uniquely identifies one placed sensor (e.g., sensor 306 of FIG. 3) and which is equal to a sensorId (e.g., sensorId 602 of FIG. 6) of each sensor event record (e.g. sensor event record 601 of FIG. 6) sent by a sensor 306. Additionally, sensor metadata records 701 include a method number 703 that identifies a method within the scope of its declaring class, and a class key 704 that uniquely identifies a class and the bytecode representation of a class within the scope of all connected applications (e.g., applications 301 of FIG. 3) on all collector nodes (e.g., collector nodes 312 of FIG. 3) which are connected to a monitoring node (e.g., monitoring node 323 of FIG. 3). The class key may include, for example, a full-qualified name of the class or a hash code generated from the bytecode representing the class.

Sensor metadata records 701 also include sensor metadata 705 that may include, for example, a sensor type identifying the type of the sensor (e.g., a timing sensor measuring execution times and counting sensor counting the executions of a method, for example), the name of the class which contains the sensor, the name of the method into which the sensor is injected, the signature of the method, and the line number of the source code where the sensor 306 is placed. Further, sensor metadata records 701 provide measurement metadata 706 that describes the measurements generated by the referred sensor 306 (e.g., the type of measurement and the unit of measurement). Moreover, sensor metadata records 701 may include a dirty flag 707 that indicates whether a specific sensor metadata record 701 has already been transferred to the monitoring node 323.

As illustrated in FIG. 7B, method metadata records 711 include information about a specific method, such as a method number 712 that uniquely identifies a method within the scope of its defining class, a method name 713 that contains the name of the method, and a class key 714 that is structured equally to the class key 704 of a sensor metadata record and uniquely identifies the class that contains the method described by a specific method metadata record 711. Method metadata records 711 also contain method metadata 715 that may include, for example, names and types of the method parameters, the type of the method return value, and information about annotations of the method.

As illustrated in FIG. 7C, class metadata records 721 include a class key 705 structured as the class key 704 of sensor metadata records 701 and a class name 723 holding the fully-qualified name of the described class. Additionally, class metadata records 721 contain class metadata that may include, for example, the type of the target environment for which the class was designed and implemented (e.g., Java or .Net), a name and version of the virtual machine that loaded the original bytecode (e.g., original bytecode 304 of FIG. 3) of the class, a hash code generated from the bytecode of the class, and an indicator of whether the virtual machine that loaded the class supports runtime adaptation of class bytecode.

Figures 8A, 8B:
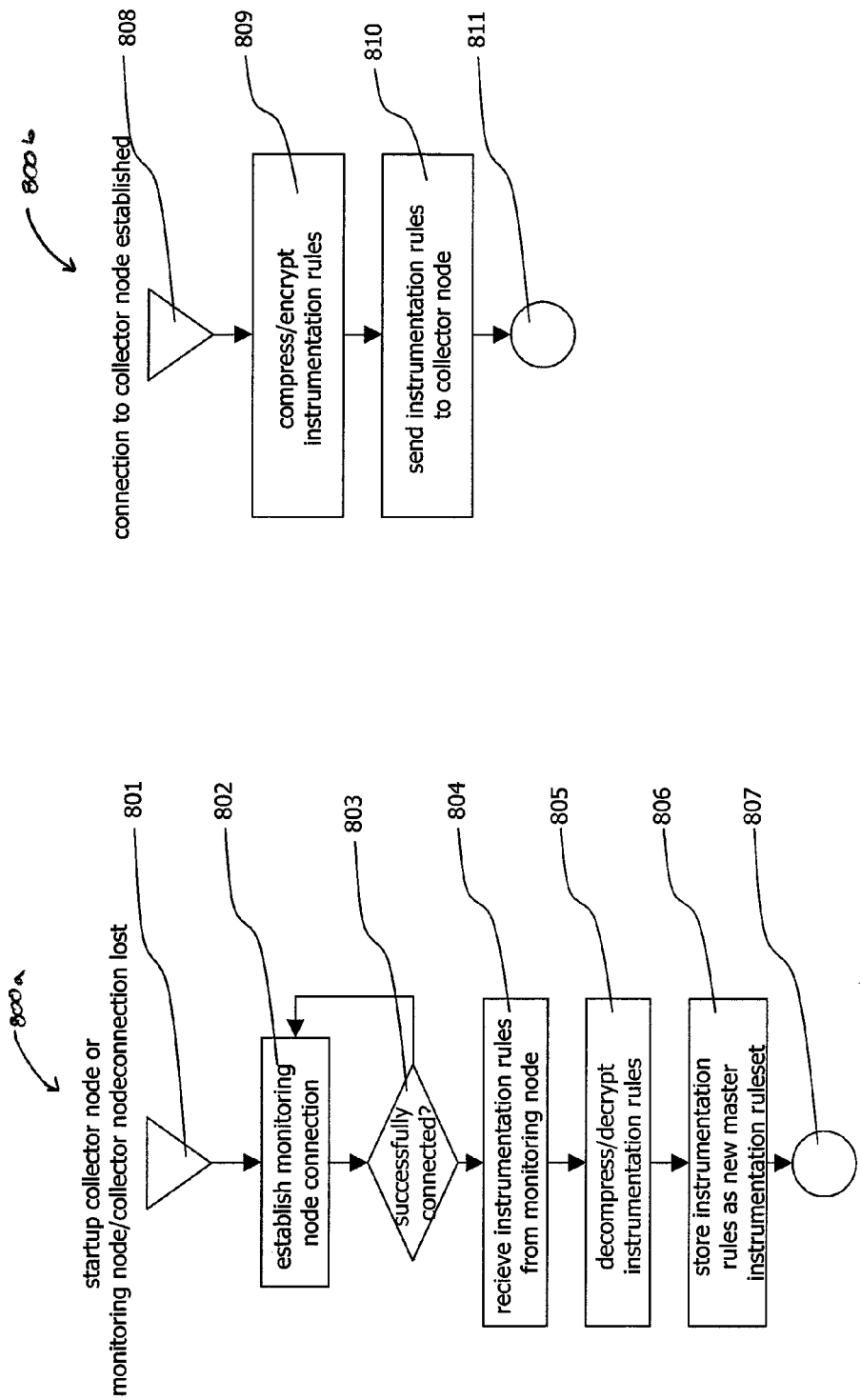
FIGS. 8A-8B are flow diagrams illustrating a handshake between a collector node and a monitoring node.

FIGS. 8A-8B are flow diagrams 800a, 800b illustrating a handshake between a collector node (e.g., collector node 312 of FIG. 3) and a monitoring node (e.g., monitoring node 323 of FIG. 3) that is performed when the collector node 312 connects to the monitoring node 323. FIG. 8A illustrates a portion of the process performed at the collector node 312. FIG. 8B illustrates a portion of the process performed at the monitoring node 323.

As illustrated in FIG. 8A, the handshake between the collector node 312 and the monitoring node 323 starts (801) when the collector node 312 is started up or attempts to reestablish a lost a connection to a monitoring node 323. The collector node 312 cyclically tries to establish a connection to the monitoring node 323 (802) and checks whether the connection was established successfully (803). If a connection was established successfully, the collector node 312 receives the instrumentation rules (e.g., instrumentation rules 319 of FIG. 3) currently available at the monitoring node's instrumentation rule repository (e.g., instrumentation rule repository 324 of FIG. 3) (804). The received instrumentation rules 319 may be decompressed and/or decrypted by the collector node's compression/encryption unit (e.g., compression/encryption unit 320 of FIG. 3) (805) and stored as a new master instrumentation rule set (e.g., master instrumentation rule set 501 of FIG. 5) in the collector node's instrumentation rule repository (e.g., instrumentation rule repository 313 of FIG. 3) (806). The portion of the process performed at the collector node 312 then ends (807).

As illustrated in FIG. 8B, at the monitoring node 323, after a collector node 312 connects (808), the instrumentation rule records 319 available at the instrumentation rule repository 324 may be compressed and/or encrypted in the monitoring node's compression/encryption unit 325 (809). The instrumentation rules 319 are then sent to the connected collector node 312. The portion of the process performed at the monitoring node 323 then ends (811).

Figure 9B:
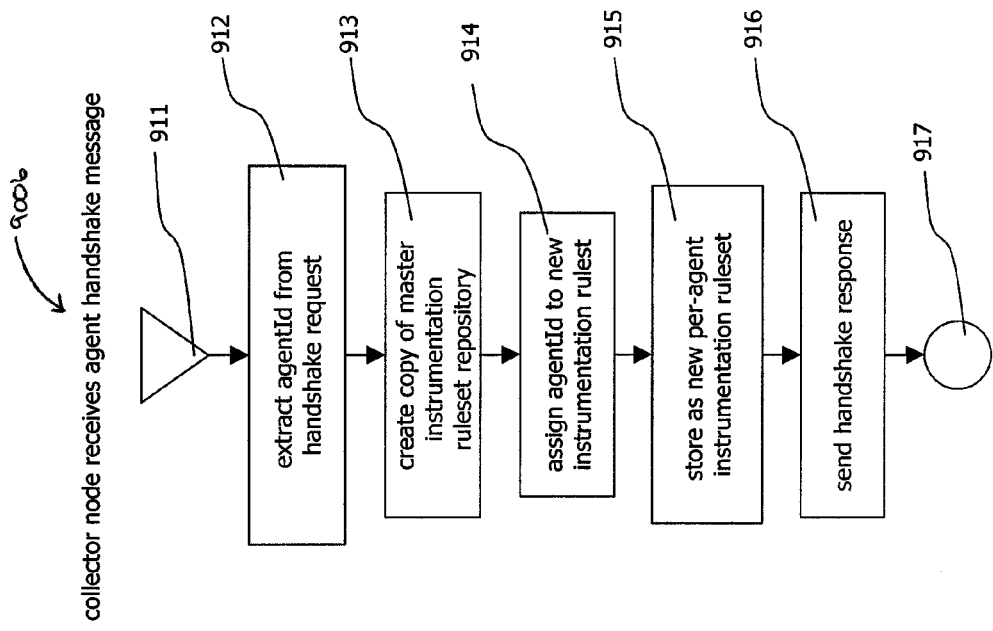
FIGS. 9A-9B are flow diagrams illustrating a handshake between an application agent and a collector node.
Figure 9A:
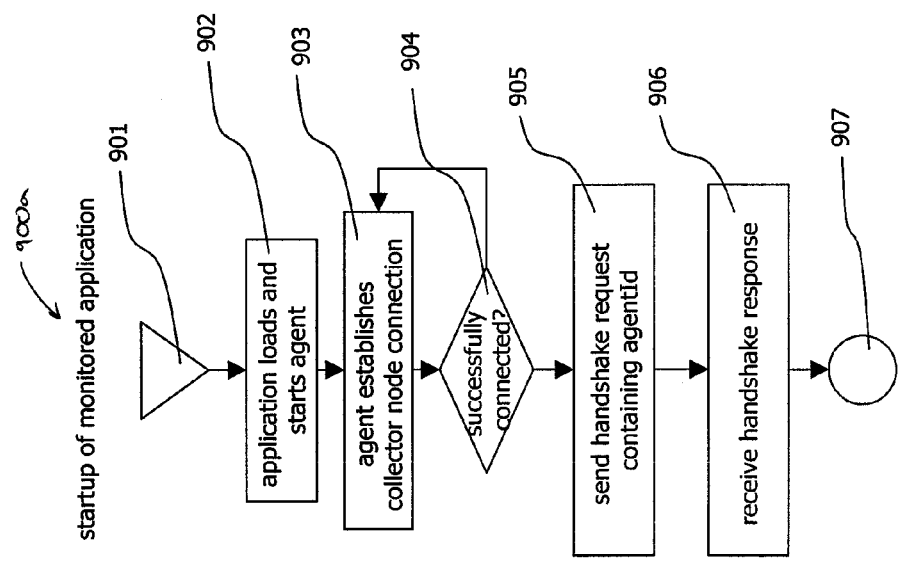

FIGS. 9A-9B are flow diagrams 900a, 900b illustrating a handshake between an agent (e.g., agent 302 of FIG. 3) and a collector node (e.g., collector node 312 of FIG. 3) that is performed when the agent 302 connects to the collector node 312. FIG. 9A illustrates a portion of the process performed at the agent 302 and FIG. 9B illustrates a portion of the process performed at the collector node 312.

As illustrated in FIG. 9A, the handshake between the agent 302 and the collector node 312 starts (901) on startup of a monitored application (e.g., application 301 of FIG. 3) that loads and starts its agent (e.g., agent 302 of FIG. 3) (902). The agent 302 cyclically tries to establish a connection to the collector node 312 (903) and checks whether the connection was established successfully (904). If a connection was established successfully, the agent 302 sends a handshake request including the agent's agentId (e.g., agentId 303 of FIG. 3) (905). After sending the handshake request, the agent 302 waits to receive a handshake response (906). The portion of the process performed at the agent 302 then ends (907).

As illustrated in FIG. 9B, when a collector node 312 receives a handshake request from an agent 302 (911) it extracts the agentId 303 from the request (912) and creates a copy of the master instrumentation rule set (e.g., master instrumentation rule set 501 of FIG. 5) in its instrumentation rule repository (e.g., instrumentation rule repository 313 of FIG. 3) (913). The collector node 312 then assigns the extracted agentId 303 to the copy of the master instrumentation rule set 501 and stores it as an agent-specific instrumentation rule set (e.g., agent-specific instrumentation rule set 502 of FIG. 5) in the instrumentation rule repository 313 (915). A handshake response is then sent to the agent 302 (916). The portion of the process performed at the collector then ends (917).

Figures 10A, 10B:
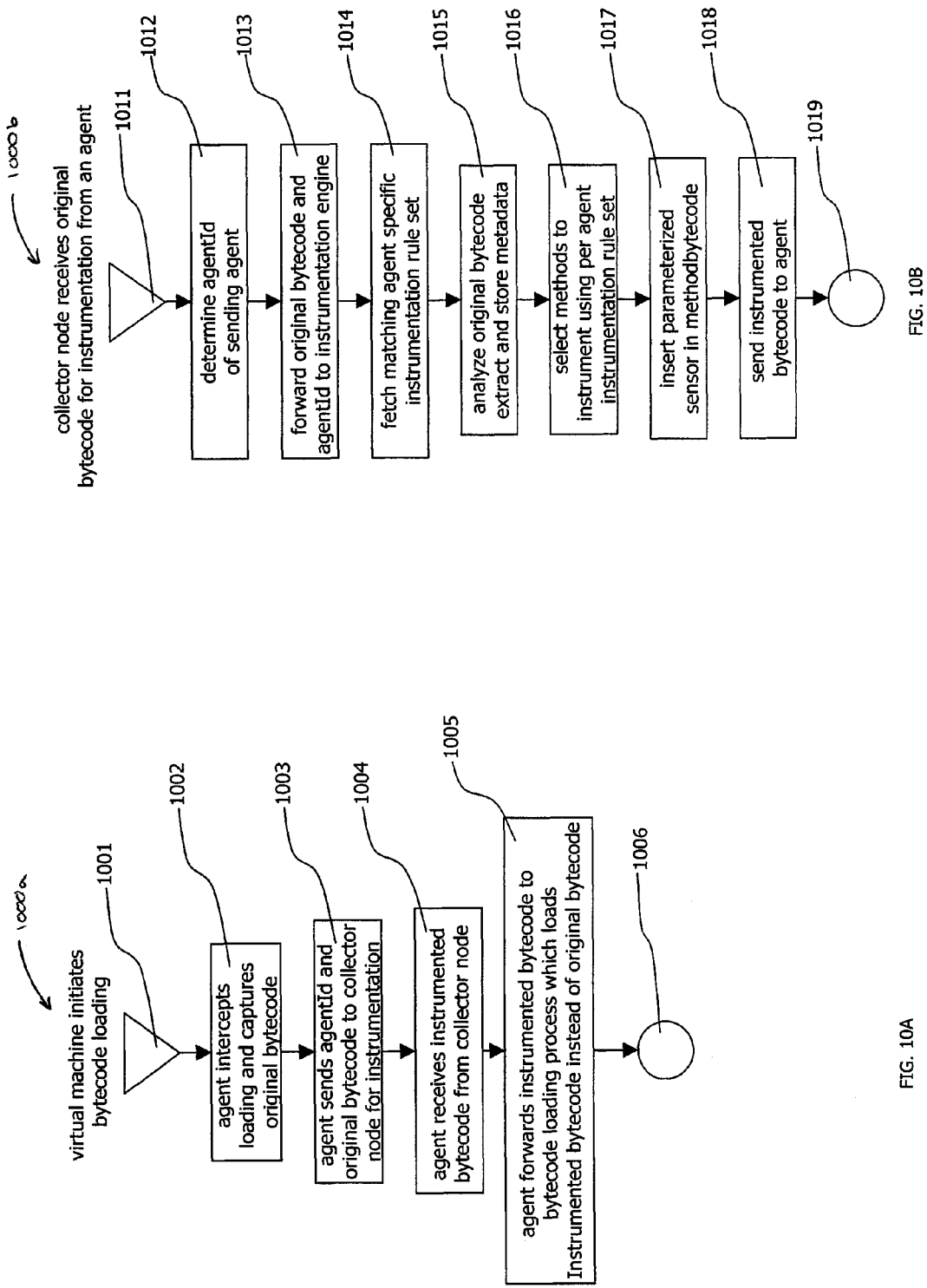
FIGS. 10A-10B are flow diagrams illustrating out-of-application instrumentation processes performed by an application agent and a collector node, respectively.

FIGS. 10A-10B are flow diagrams 1000a, 1000b illustrating out-of-application bytecode instrumentation performed by an application agent (e.g., agent 302 of FIG. 3) and a collector node (e.g., collector node 312 of FIG. 3). FIG. 10A illustrates a portion of the process performed at the agent 302 and FIG. 10B illustrates a portion of the process performed at the collector node 312.

As illustrated in FIG. 10A, out-of-application bytecode instrumentation starts when a virtual machine that runs the monitored application (e.g., application 301 of FIG. 3) initiates loading a portion of original bytecode (e.g., original bytecode 304 of FIG. 3) including, for example, a class or a part of a class (1001). An agent (e.g., agent 302 of FIG. 3), which was loaded and started by the monitored application 301 on startup of the application 301, intercepts the loading process and captures the original bytecode 304 (1002). The captured original bytecode 304 is then sent to the collector node 312 (1003). The agent 302 then waits to receive instrumented bytecode (e.g., instrumented bytecode 305 of FIG. 3) (1004). After receiving instrumented bytecode 305, the agent 302 forwards the instrumented bytecode to the bytecode loading process of the virtual machine that runs the monitored application 301 (1005). This causes the virtual machine to load the instrumented bytecode 305 from the collector node 312 forwarded by the agent 302 instead of the original bytecode 304. The portion of the process performed at the agent 302 then ends (1006).

As illustrated in FIG. 10B, upon receiving original bytecode 304 from an agent 302 (1011), the collector node 312 determines the agentId (e.g., agentId 303 of FIG. 3) of the agent 302 that sent the original bytecode 304 (1012). To determine the agentId 303 of the sending agent, the collector node 312 may, for example, maintain a mapping from agent connections to agentIds 303. Original bytecode 304 and the agentId 303 are then forwarded to an instrumentation engine (e.g., instrumentation engine 314 of FIG. 3) (1013), which fetches the agent-specific instrumentation rule set (e.g., agent-specific instrumentation rule set 502 of FIG. 5) from the collector node's instrumentation rule repository (e.g., instrumentation rule repository 313) (1014). The instrumentation engine 314 analyzes the original bytecode 304 and extracts metadata describing the original bytecode 304 (1015). Extracted metadata may include, for example, the name of the class defined in the received bytecode, the names, signatures and return value type of methods of the class, and annotations defined for class and methods.

Appropriate class metadata records (e.g., class metadata records 721 of FIG. 7C) and method metadata records (e.g., method metadata records 711 of FIG. 7B) are created and initialized with the extracted metadata. Initialization may include, for example, creating a class key (e.g., class key 722 of FIG. 7C) uniquely identifying the class defined in the received original bytecode 304 and the class keys (e.g., class key 714 of FIG. 7B) of all created method metadata records 711. Further initialization may include extracting a method number (e.g., method number 712 of FIG. 7B) identifying a method within the scope of its defining class from original bytecode, and setting the method number 712 and method name (e.g., method name 713 of FIG. 7B) to each created method metadata record 711 and setting the extracted class name to the class name (e.g., class name 722 of FIG. 7C) of the created class metadata record 721. The metadata records are then stored in the collector node's instrumentation metadata repository (e.g., instrumentation metadata repository 315 of FIG. 3).

The instrumentation engine 314 evaluates the extracted metadata against the instrumentation rules (e.g., instrumentation rule 401 of FIG. 4) in the agent specific instrumentation rule set 502 to filter the methods that are augmented with sensor bytecode, and also uses the sensor type (e.g., sensor type 405 of FIG. 4) of the matching instrumentation rules 401 to select the bytecode of the appropriate sensor (e.g., sensor 306 of FIG. 3) for each filtered method and augment it with the sensor 306 (1016). The instrumentation engine 314 then creates a unique sensorId (e.g., sensorId 602 of FIG. 6) for each sensor which is instrumented to the original bytecode 304 and creates parameterized sensor 306 bytecode for each placed sensor 306 which is inserted into the original bytecode 304 to create instrumented bytecode (e.g., instrumented bytecode 305 of FIG. 3) (1017) (described in greater detail with reference to FIG. 11). The instrumented bytecode 305 is then sent back to the agent 302 that sent the original bytecode 304 (1018). The portion of the process performed at the collector node 312 then ends (1019).

Figure 11:
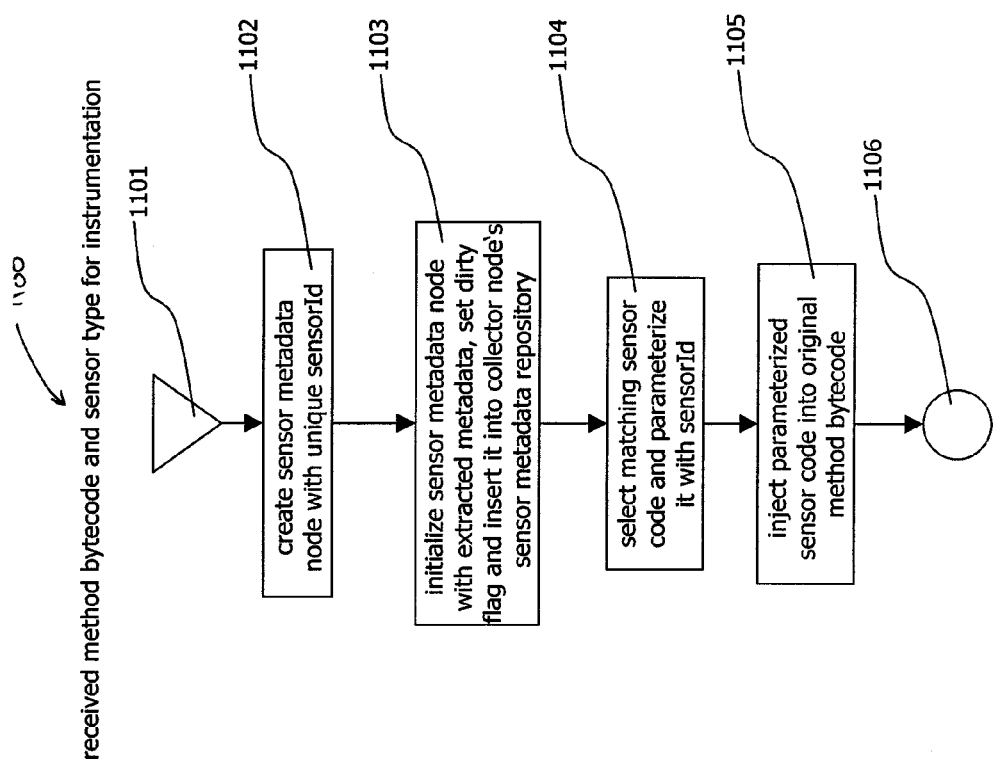
FIG. 11 is a flow diagram illustrating the creation of sensor metadata and injection of parameterized sensor code into original bytecode.

FIG. 11 is a flow diagram 1100 illustrating the creation of sensor metadata, the injection of parameterized sensor bytecode, and the creation of a sensor metadata record (e.g., sensor metadata record 701 of FIG. 7) for the sensor. An instrumentation engine (e.g., instrumentation engine 314 of FIG. 3) receives a portion of original bytecode (e.g., original bytecode 304 of FIG. 3) representing a method to be augmented with a sensor (e.g., sensor 306 of FIG. 3), together with a type of sensor to be inserted (1101). A sensor metadata record 701 with a unique sensorId (e.g., sensorId 702 of FIG. 7) is created (1102). The sensor metadata record 701 is then initialized with the metadata identifying the class and method into which the sensor is placed such as, for example, the class key (e.g., class key 704 of FIG. 7) uniquely identifying the class containing the received method bytecode, sensor-specific metadata (e.g., sensor metadata 705 of FIG. 7) and measurement-specific metadata (e.g., measurement metadata 706 of FIG. 7), and a dirty flag (e.g., dirty flag 707 of FIG. 7) set to indicate that the sensor metadata record 701 has not been sent to the monitoring node (e.g., monitoring node 323 of FIG. 3).

The sensor 306 bytecode matching the sensor type is selected (1104) and parameterized with the generated sensorId 702 (1102) in a way that the sensor 306 sets the sensorId 702 with which it was parameterized to each sensor event record (e.g., sensor event record 601 of FIG. 6) that it creates. The parameterized sensor bytecode is then inserted into the received method bytecode to generate instrumented bytecode (e.g., instrumented bytecode 305 of FIG. 3) (1105). The process then ends (1106).

Figure 12:
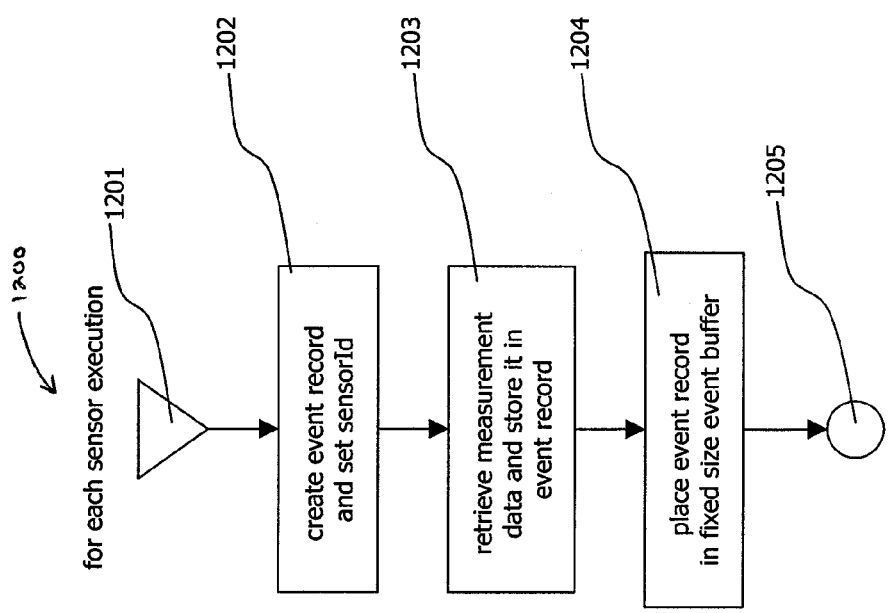
FIG. 12 is a flow diagram illustrating the execution of an instrumented sensor.

FIG. 12 is a flow diagram 1200 illustrating execution of an instrumented sensor (e.g., sensor 306 of FIG. 3) within a monitored application (e.g., application 301 of FIG. 3), including creation, initialization and storage of an event record (e.g., event record 601 of FIG. 6) representing a current measurement. Execution of instrumented bytecode (e.g., instrumented bytecode 305 of FIG. 3) by the monitored application 301 invokes the execution of a sensor (1201), which causes the creation of a new event record 601 (1202) in which the sensorId (e.g., sensorId 602 of FIG. 6) of the created event record 601 is set to the unique value with which the sensor 306 bytecode was parameterized. The sensor 306 acquires measurement values and stores the measurement values in the measurement data (e.g., measurement data 603 of FIG. 6) of the event record 601 (1203). The number of acquired measurements, their context, and measurement acquisition methods may vary depending on sensor 306 type. The event record 601 is then inserted into a fixed-size event buffer (e.g., fixed-size event buffer 309 of FIG. 3) of the agent (e.g., agent 302 of FIG. 3) (1204). The process then ends (1205), although execution of the application-specific part of the instrumented bytecode 305 continues.

Figure 13:
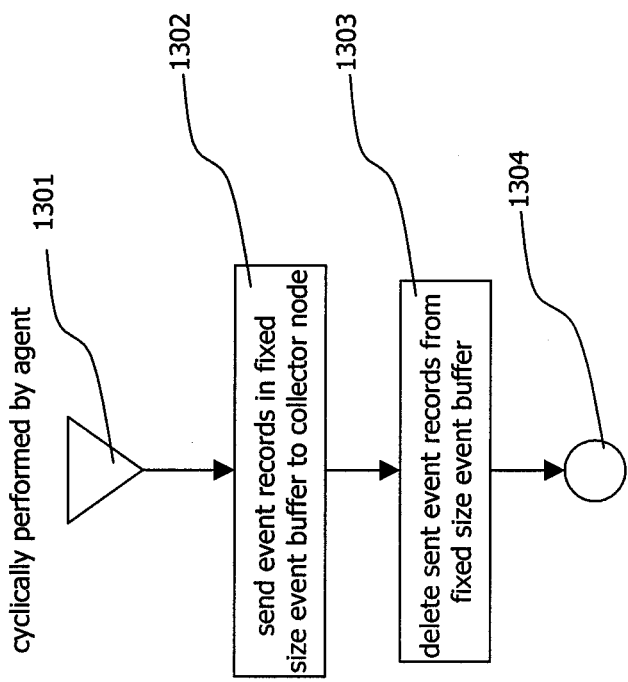
FIG. 13 is a flow diagram illustrating the cyclical transfer of event records from the agent deployed to an application to the collector node.

FIG. 13 is a flow diagram 1300 illustrating a cyclical transfer of event records (e.g., sensor events 310 of FIG. 3), stored in a fixed-size event buffer (e.g., fixed-size event buffer 309 of FIG. 3) of an agent (e.g., agent 302 of FIG. 3) deployed to the monitored application (e.g., monitored application 301 of FIG. 3), to a collector node (e.g., collector node 312 of FIG. 3). The agent starts scanning the fixed-size event buffer 309 (1301). Scanning is performed cyclically and asynchronously to execution of sensor bytecode or application-specific bytecode. The agent 302 then sends all event records 310 contained in the fixed-size event buffer 309 to the collector node 312 (1302). The event buffer 309 is then cleared and all event records 310 are deleted (1303). The process then ends (1304).

Figure 14:
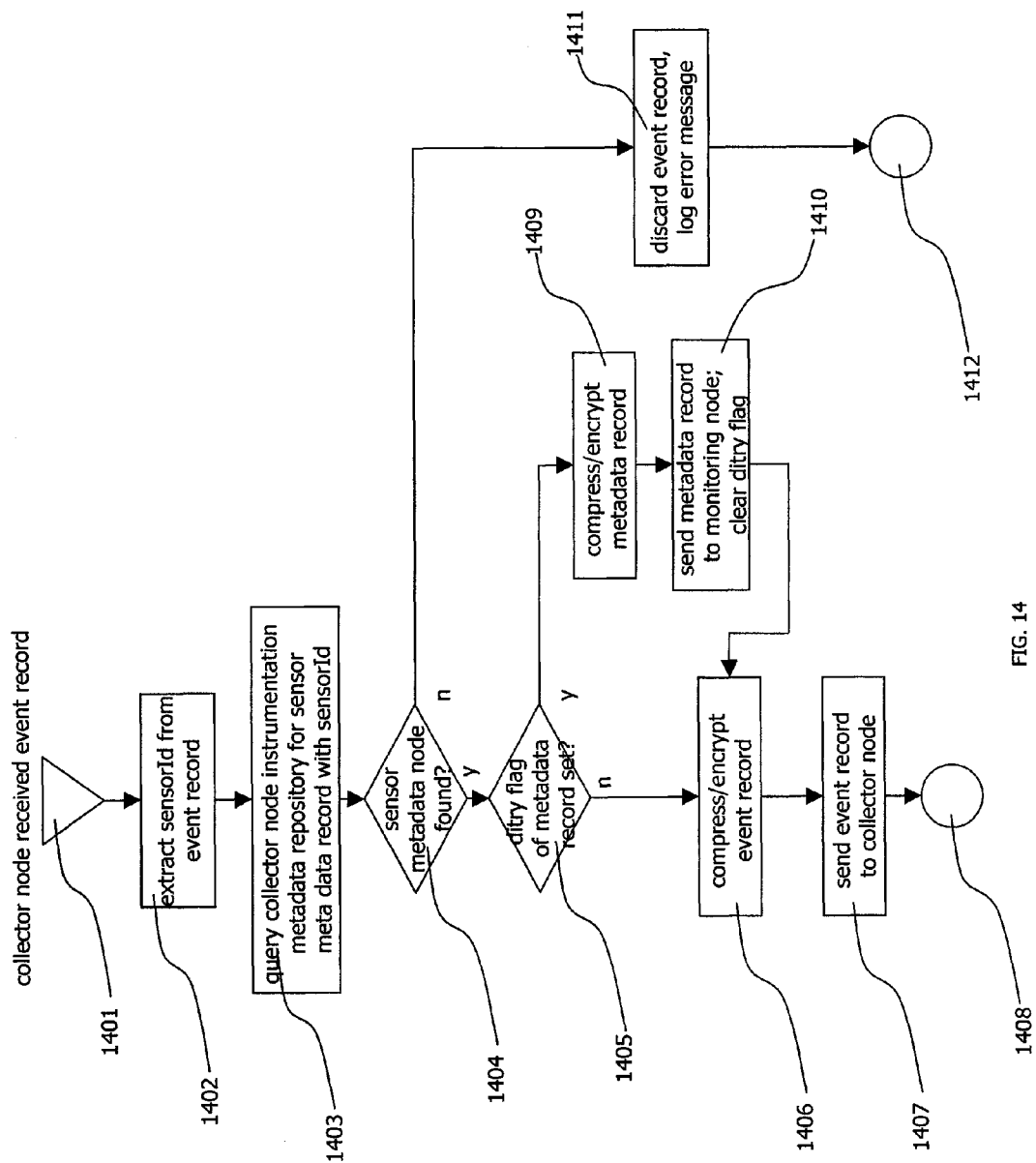
FIG. 14 is a flow diagram illustrating the forwarding of event records from the collector node to the monitoring node.

FIG. 14 is a flow diagram 1400 illustrating the forwarding of event records (e.g., sensor events 321 of FIG. 3), received at an event collector (e.g., event collector 316 of FIG. 3) of a collector node (e.g., collector node 312 of FIG. 3), to a monitoring node (e.g., monitoring node 323 of FIG. 3), including sending of corresponding sensor metadata record (e.g., instrumentation metadata 320 of FIG. 3), if required. An event record 310 is received by an event collector 316 of the collector node 312 (1401), which extracts the sensorId (e.g., sensorId 602 of FIG. 6) from the received event record 310 (1402). The event collector 316 then queries the collector node's instrumentation metadata repository (e.g., instrumentation metadata repository 315 of FIG. 3) for a sensor metadata record (e.g., sensor metadata record 701 of FIG. 7) with a matching sensorId (e.g., sensorId 702 of FIG. 7) (1403).

The instrumentation metadata repository 315 then checks if a matching sensor metadata record 701 is available (1404). If no such sensor metadata record was found, then the received event record 310 is discarded (1411) and the process then ends (1412). Otherwise, if a matching sensor metadata record 701 is found, the even collector 316 checks if a dirty flag (e.g., dirty flag 707 of FIG. 7) of the found sensor metadata record 701 indicates that the sensor metadata record 701 has already been sent to the monitoring node 323 (1405). If the sensor metadata record 701 has not been sent to the monitoring node 323, the sensor metadata record 701 may be compressed and/or encrypted in a compression/encryption unit (e.g., compression/encryption unit 320 of FIG. 3) of the collector node 312 (1409). The sensor metadata record 701 then may be sent by an event sender (e.g., event sender 318 of FIG. 3), optionally being buffered in an event buffer (e.g., event buffer 317 of FIG. 3), to the monitoring node 323 (1410). Additionally, the dirty flag 707 of the sensor metadata record 701 in the instrumentation metadata repository 315 is set to indicate that the sensor metadata record 701 has already been sent to the monitoring node 323 (1410).

After the sensor metadata record 701 is sent to the monitoring node 323 or if the dirty flag 707 of the found sensor metadata record 701 indicates that the found sensor metadata record 701 was already sent to the monitoring node 323, the received event record 310 may be compressed and/or encrypted in the compression/encryption unit 320 of the collector node 312 (1406), and sent to the monitoring node 323 (1407). The process then ends (1408).

Figure 15:
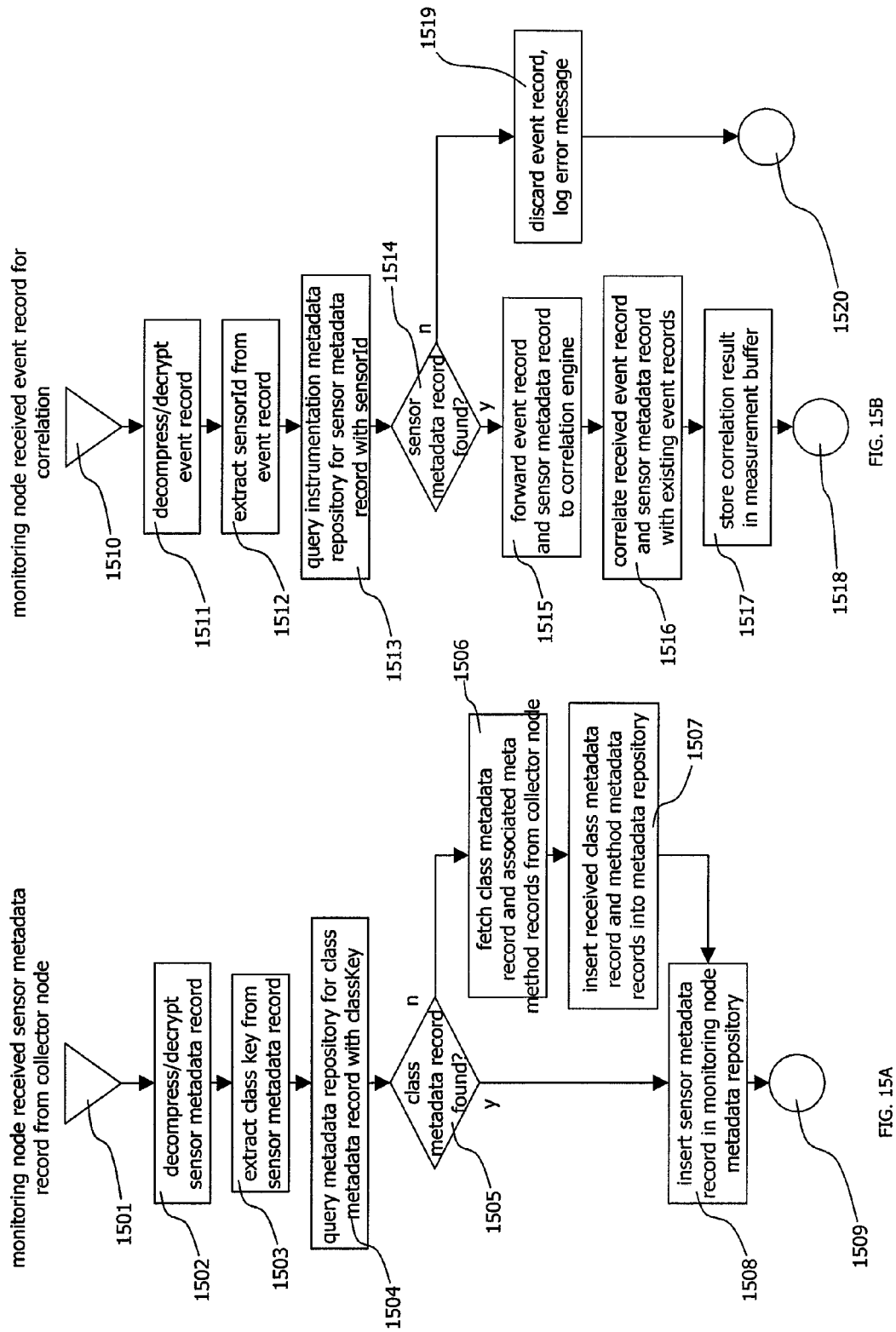
FIGS. 15A-15B are flow diagrams illustrating the correlation of incoming event records at the monitoring node with matching sensor metadata and the insertion of incoming sensor metadata records into the metadata repository of the monitoring node, respectively.

FIGS. 15A-15B are flow diagrams 1500a, 1500b illustrating processing of received sensor metadata records (e.g., instrumentation metadata 320 of FIG. 3) and event records (e.g., sensor events 321 of FIG. 3), respectively. FIG. 15A illustrates the processing of an incoming sensor metadata record (e.g., sensor metadata record 701 of FIG. 7). FIG. 15B illustrates the correlation of an incoming event record (e.g., event record 601 of FIG. 6) with existing event records (e.g., stored in the event collector 326 of FIG. 3) and instrumentation metadata (i.e., sensor metadata records 701, method metadata records 711 and class metadata records 721 of FIGS. 7A-7C, respectively) (e.g., stored in the instrumentation metadata repository 327 of the monitoring node 323 of FIG. 3) to create higher-level measurement data.

As illustrated in FIG. 15A, the monitoring node 323 receives a sensor metadata record 701 from the collector node 312 (1501) at its event collector 326, and may decompress and/or decrypt the received sensor metadata record 320 in a compression/encryption unit (e.g., compression/encryption unit 325 of FIG. 3) (1502). The event collector 326 may extract a class key (e.g., class key 704 of FIG. 7) from the received sensor metadata record 701 (1503) and query the instrumentation metadata repository 327 for a class metadata record 721 with a matching class key (e.g., class key 722 of FIG. 7C) (1504). If a class metadata record 721 is found (1505), the received sensor metadata record 701 is stored in the instrumentation metadata repository 327 of the monitoring node 323 (1508).

Otherwise, if a class metadata record 721 is not found (1505), the monitoring node 323 fetches the class metadata record 721 and associated method metadata records 711 from an instrumentation metadata repository (e.g., instrumentation metadata repository 315 of FIG. 3) at the collector node 312 that sent the sensor metadata record 701 (1506) and stores the received class metadata record 721 and method metadata records 711 in its instrumentation metadata repository 327 (1507). This "lazy" fetching of class metadata records 721 and method metadata records 711 guarantees that only metadata that is required on the monitoring node 323 is actually transferred (e.g. as part of the instrumentation metadata 320 of FIG. 3). Additionally, it also allows sharing class and method metadata between different collector nodes 312 and agents (e.g., agent 302 of FIG. 3). The received sensor metadata record 701 is then stored in the instrumentation metadata repository 327 of the monitoring node 323 (1508). The process then ends (1509).

As illustrated in FIG. 15B, upon receiving an event record 601 from a collector node 312 (1510), the monitoring node 323 may decompress and/or decrypt the received event record 601 (1511) and extract a sensorId (e.g., sensorId 602 of FIG. 6) from the event record 601 (1512). The event collector 326 then queries the instrumentation metadata repository 327 for a sensor metadata record 701 with a matching sensorId (e.g., sensorId 702 of FIG. 7) (1513). If a sensor metadata record 701 is not found (1514), the received event record 601 is discarded (1519) and the process ends (1520).

Otherwise, if a sensor metadata record 701 is found (1514), the received event record 601 and the fetched sensor metadata record 701 are forwarded to an event correlation module (e.g., event correlation module 328 of FIG. 3) (1515) which correlates the fetched sensor metadata record 701 and the received event record 601 with existing event records to create high-level measurements (1516). The event correlation module 328 also may fetch records matching the class metadata record 721 and method metadata records 711 for correlation. The calculated measurements are stored in a measurement buffer (e.g., measurement buffer 329 of FIG. 3) for further analysis and visualization by an analysis and visualization module (e.g., analysis and visualization module 330 of FIG. 3) (1517). The process then ends (1518).

Figure 16:
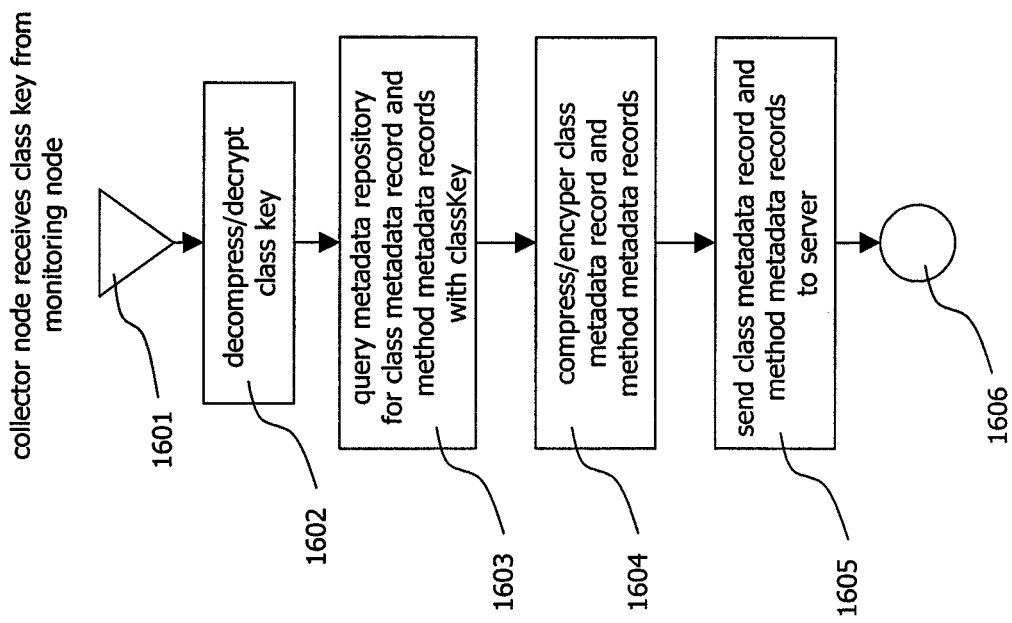
FIG. 16 is a flow diagram illustrating the transfer of class metadata from the collector node to the monitoring node.

FIG. 16 is a flow diagram 1600 illustrating the transfer of a class metadata record (e.g., class metadata record 721 of FIG. 7C) and matching method metadata records (e.g., method metadata record 711 of FIG. 7B) from a collector node (e.g., collector node 312 of FIG. 3) to a monitoring node (e.g., monitoring node 323 of FIG. 3). Upon receiving a class key (e.g., class key 704 of FIG. 7A) from the monitoring node 323 (1601), the collector node 312 may decode and/or decrypt the incoming class key 704 in a compression/encryption unit (e.g., compression/encryption unit 320 of FIG. 3) (1602). An instrumentation engine (e.g., instrumentation engine 314 of FIG. 3) then queries an instrumentation metadata repository (e.g., instrumentation metadata repository 315 of FIG. 3) for class metadata records 721 and method metadata records 711 with matching class keys 714, 722 (1603). Metadata records found may be compressed and/or encrypted by the compression/encryption unit 320 of the collector node 312 (1604) and sent to the monitoring node 323 (1605). The process then ends (1606).

Figure 17:
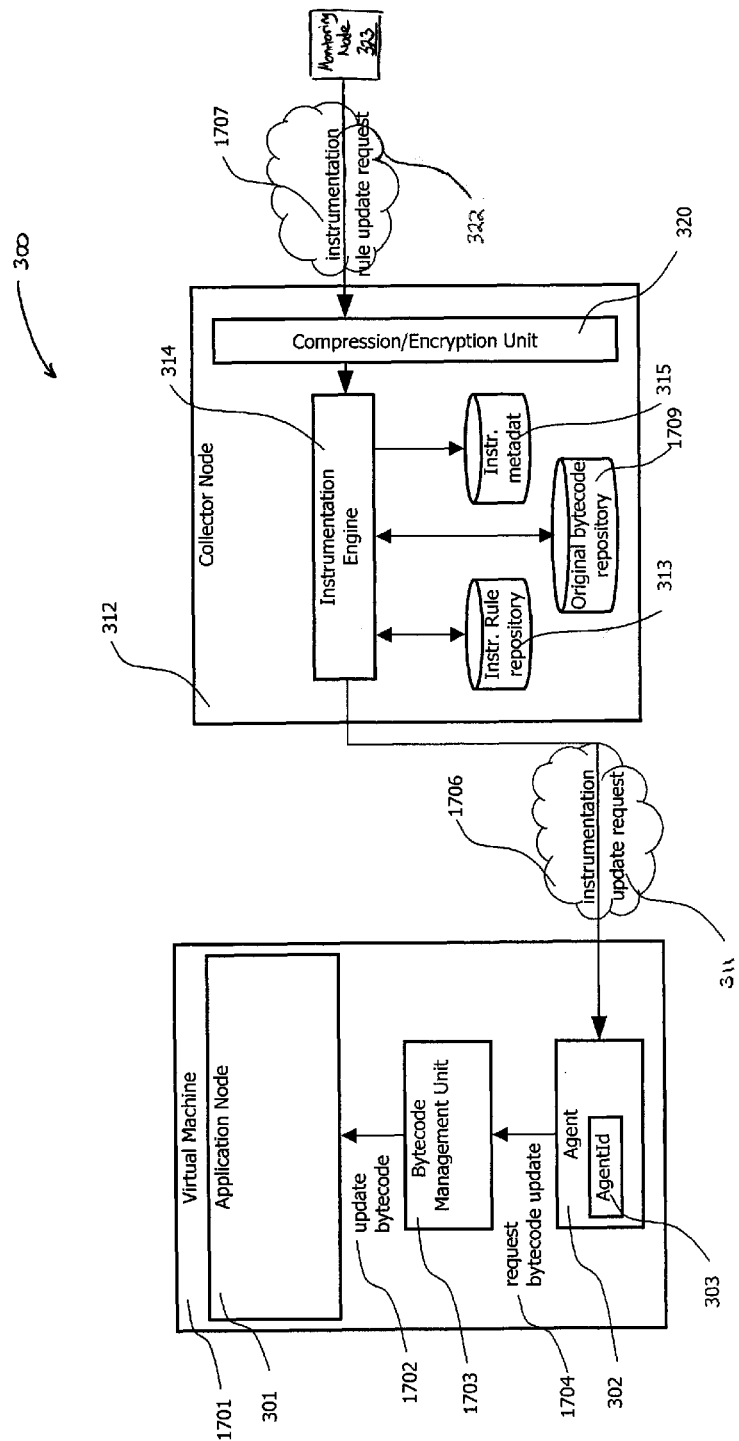
FIG. 17 is a block diagram illustrating instrumentation update of agent instrumentation during application runtime.

FIG. 17 is a block diagram illustrating update of agent 302 instrumentation during application 301 runtime (e.g., as may be employed in the monitoring system 300 according to an example embodiment of the present invention as illustrated in FIG. 3). A collector node 312, connected to a monitoring node 323 by WAN connection (e.g., network connection 322 of FIG. 3), receives an instrumentation rule update request 1707 including information about desired instrumentation changes, such as information to determine to which application the instrumentation update should be applied (i.e., agentId 303) and which instrumentation updates should be performed. The instrumentation rule update request 1707 may be received in a compressed and/or encrypted form and may be decompressed and/or decrypted in the compression/encryption unit 320 of the collector node 312. The decompressed and/or decrypted instrumentation rule update request 1707 is then forwarded to the instrumentation engine 314 for processing.

The instrumentation engine 314 maintains an original bytecode repository 1709 including bytecode repository records which hold the original bytecode 304 of a class, as received from the agent 302, together with metadata about the class (e.g., class key 704, 714 and 722 in FIGS. 7A-7C, respectively), thereby allowing a determination of the class that was the origin of the bytecode.

Upon receiving an instrumentation rule update request 1707 the instrumentation engine 314 fetches original bytecode of the classes affected by the instrumentation rule update request 1707 from the original bytecode repository 1709. The instrumentation engine then applies the instrumentation rule update included in the instrumentation rule update request 1707 to the instrumentation rule repository 313 and performs instrumentation of the affected classes. The instrumentation process also includes updating an instrumentation metadata repository 315 to match the updated instrumentation. After creating new instrumented bytecode (e.g., instrumented bytecode 305 of FIG. 3) from the original bytecode (e.g., original bytecode 304 of FIG. 3) stored in the original bytecode repository 1709, the collector node 312 sends an instrumentation update request 1705 to the agent 302 identified by the agentId 303 received with the instrumentation rule update request 1707 via a LAN connection (e.g., network connection 311 of FIG. 3). The instrumentation update request 1705 includes information to identify all classes that have to be updated to match the new instrumentation rules, together with the new instrumented bytecode 305 for those classes.

The agent 302 then prepares and sends a bytecode update request 1704 to a bytecode management unit 1703 of the virtual machine 1701 that loaded the original bytecode, which performs the required bytecode updates at runtime. An example for such a bytecode update request is a call to the RedefineClasses method of the Java JVMTI API.

Figure 18:
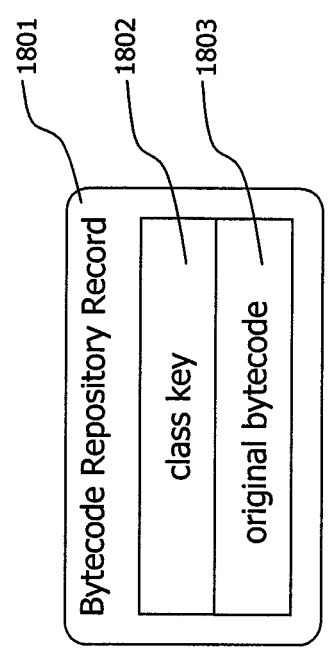
FIG. 18 is a block diagram illustrating a bytecode repository record that may be used to store original bytecode.

FIG. 18 is a block diagram illustrating a bytecode repository record 1801 which may be used to store original bytecode (e.g., original bytecode 304 of FIG. 3) within an original bytecode repository (e.g., original bytecode repository 1709 of FIG. 17). The bytecode repository record includes a class key field 1802, which may be used to identify a specific class (i.e., similar to class keys 704, 714 and 722 of FIGS. 7A-7C, respectively). Additionally, the bytecode repository record 1801 includes an original bytecode field 1803 to store received original bytecode 304 of the corresponding class 1802.

Figure 19:
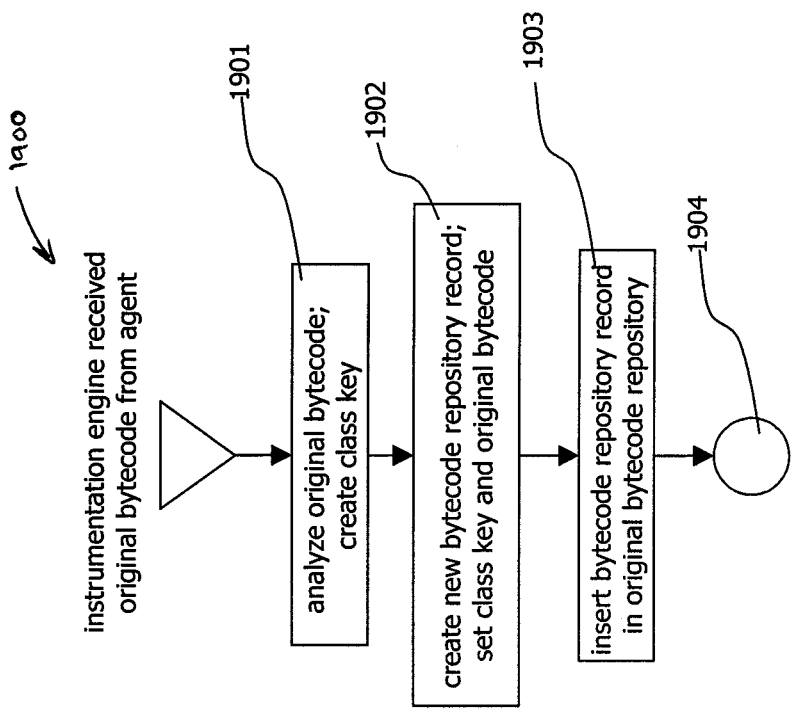
FIG. 19 is a flow diagram illustrating a method of populating an original bytecode repository with original bytecode repository records representing received original bytecode.

FIG. 19 is a flow diagram 1900 illustrating a method of populating an original bytecode repository (e.g., original bytecode repository 1709 of FIG. 17) with bytecode repository records (e.g., bytecode repository record 1801 of FIG. 18) representing received original bytecode (e.g. original bytecode 304 of FIG. 3). Upon receiving original bytecode 304 from an agent (e.g., agent 302 of FIG. 17), an instrumentation engine (e.g., instrumentation engine 314 of FIG. 17) analyzes the received original bytecode 304 and creates a class key (e.g., class key 1802 of FIG. 18) for the received bytecode (1901). The instrumentation engine 314 then creates and initializes a new bytecode repository record 1801 with the created class key 1802 and original bytecode 304 (1902) and stores the bytecode repository record 1801 in the original bytecode repository 1709. The process ends then (1904).

Figure 20:
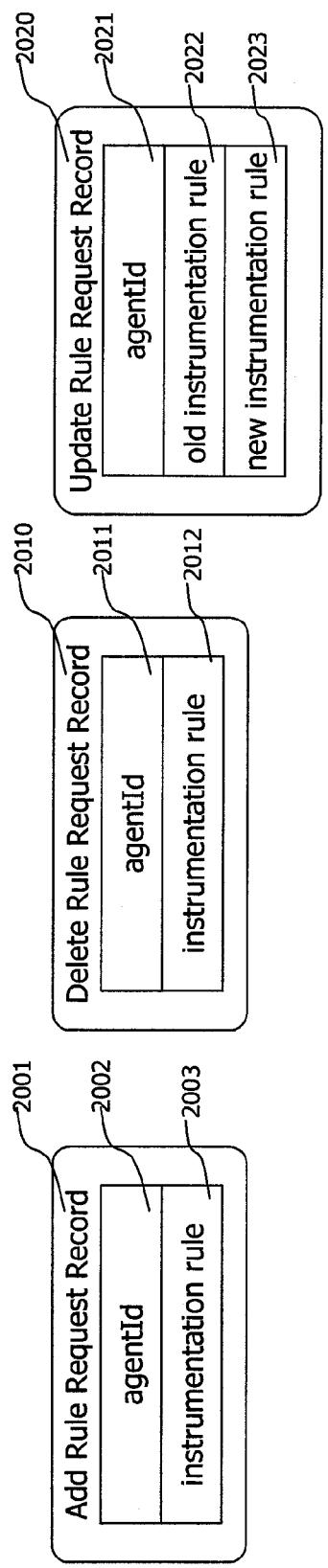
FIGS. 20A-20C are block diagrams illustrating instrumentation rule update requests to add, remove and update, respectively, an instrumentation rule for an agent-specific instrumentation rule set.

FIGS. 20A-20C are block diagrams illustrating instrumentation rule update requests to add, delete and update, respectively, an instrumentation rule for an agent-specific instrumentation rule set (e.g., agent-specific instrumentation rule set 502 of FIG. 5).

As illustrated in FIG. 20A, an add rule request record 2001 includes an agentId field 2002 identifying an agent specific instrumentation rule set 502, and an instrumentation rule field 2003, which may contain an instrumentation rule (e.g., instrumentation rule 401 of FIG. 4) that should be added to the agent-specific instrumentation rule set 502.

As illustrated in FIG. 20B, a delete rule request record 2010 includes an agentId field 2011 to identify an agent-specific instrumentation rule set 502, and an instrumentation rule field 2012, which may contain an instrumentation rule 401 that may be deleted from an agent-specific instrumentation rule set 502.

As illustrated in FIG. 20C, an update rule request record 2020 includes an agentId field 2020 identifying an agent-specific instrumentation rule set 502, an old instrumentation rule 2022 that may identify an instrumentation rule 401 to be deleted, and a new instrumentation rule 2023 that may contain an instrumentation rule 401 to be added.

Figure 21:
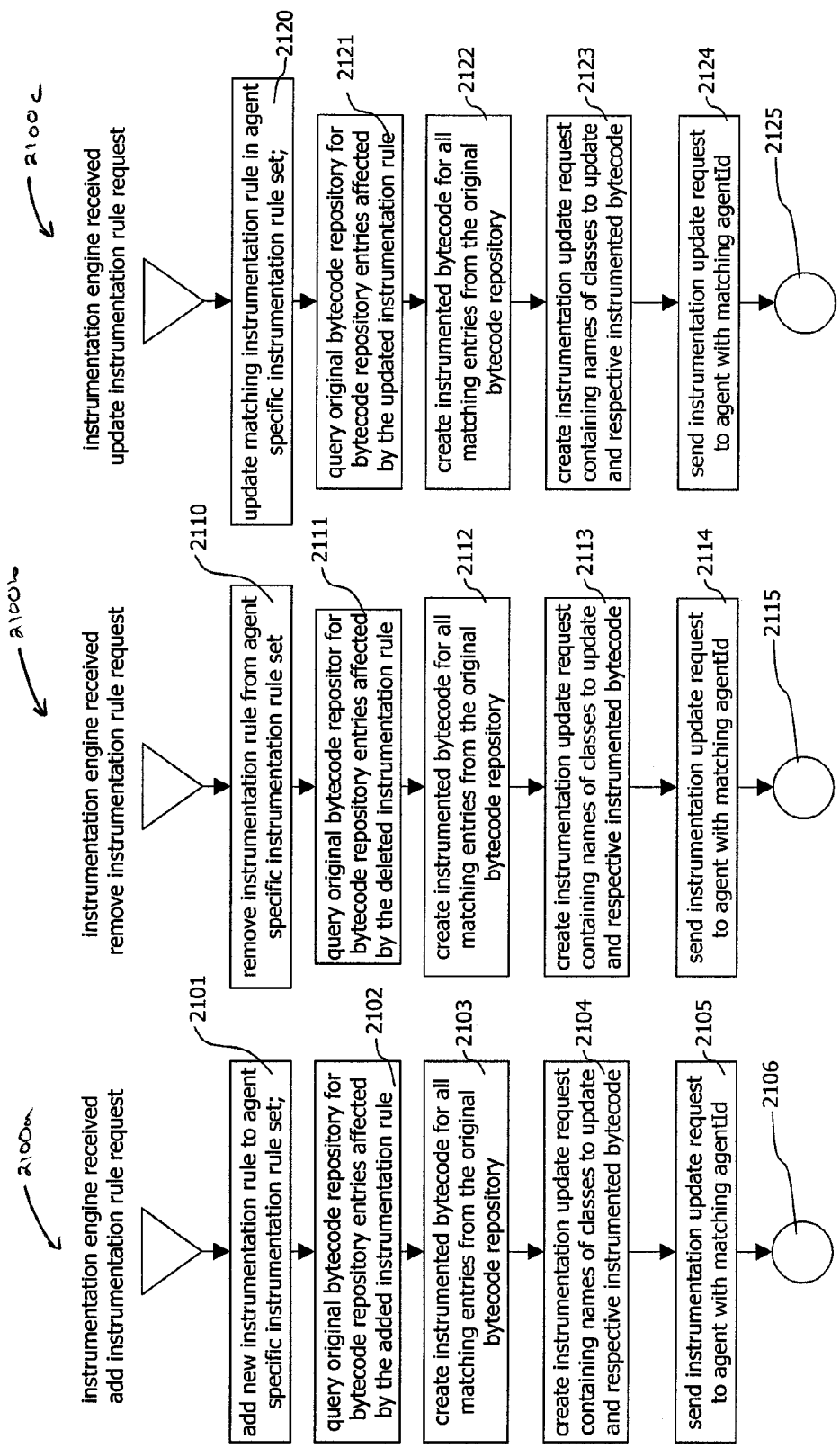
FIGS. 21A-21C are flow diagrams illustrating methods of processing add, delete and update instrumentation rule update requests, respectively, by an instrumentation engine.

FIGS. 21A-21C are flow diagrams 2100a-2100c illustrating methods of processing instrumentation rule update requests (e.g., add 2001, delete 2010 and update 2020 instrumentation rule update requests of FIGS. 20A-20C, respectively) by an instrumentation engine (e.g., instrumentation engine 314 of FIG. 17).

FIG. 21A is a flow diagram 2100a illustrating a method of handling an add rule request record 2001. Upon receiving an add rule request record 2001, the instrumentation engine 314 adds the newly received instrumentation rule (e.g., instrumentation rule 401 of FIG. 4) to the agent-specific instrumentation rule set (e.g., agent-specific instrumentation rule set 502 of FIG. 5) identified by the agentId (e.g., agentId 2002 of FIG. 20A) received with the add rule request 2001 (2101). Then the original bytecode repository (e.g., original bytecode repository 1709 of FIG. 17) is queried for bytecode repository records (e.g., bytecode repository records 1801) that represent classes that are affected by the instrumentation rule set change. This may be performed, for example, by filtering bytecode repository records 1801 with class keys (e.g., class key 1802) having the same class name as the class name (e.g., class name 402 of FIG. 4) specified in the received instrumentation rule 401 (2102). The instrumentation engine 314 creates instrumented bytecode (e.g., instrumented bytecode 305 of FIG. 3) out of original bytecode (e.g., original bytecode 304 of FIG. 3) from matching bytecode repository entries 1801 (2103). The instrumentation engine 314 creates an instrumentation update request (e.g., instrumentation update request 1706 of FIG. 17), including information required by the virtual machine (e.g., virtual machine 1701 of FIG. 17) to identify the class to update, such as the full qualified name of the class and an identifier of the entity that loaded the class (e.g. the Java ClassLoader instance that originally loaded the class), and the respective instrumented bytecode (2104). The instrumentation update request 1706 is then sent to the agent 302 identified by the agentId 2002 received with the add instrumentation rule request 2001. Then the process ends (2106)

FIG. 21B is a flow diagram 2100b illustrating a method of handling of a delete rule request record 2010. The method starts by an instrumentation engine 314 removing a received instrumentation rule (e.g., instrumentation rule 401 of FIG. 4) from an agent specific instrumentation rule set (e.g., agent specific instrumentation rule set 502 of FIG. 5) (2110). The instrumentation engine 314 then queries the original bytecode repository (e.g., original bytecode repository 1709 of FIG. 17) for matching bytecode repository records (e.g., bytecode repository record 1801 of FIG. 18) (2111). The instrumentation engine 314 then creates new instrumented bytecode (e.g., instrumented bytecode 305 of FIG. 3) (2112) and an instrumentation update request (e.g., instrumentation update request 1706 of FIG. 17) (2114) and sends it to the agent (e.g., agent 302 of FIG. 17) (2114). The process then ends (2115).

FIG. 21C is a flow diagram 2100c illustrating a method of handling an update rule request record 2020. The instrumentation engine 314 updates the agent-specific rule set (e.g., agent-specific rule set 502 of FIG. 5) (2120), fetches affected bytecode repository records (e.g., bytecode repository record 1801 of FIG. 18) from the original bytecode repository (e.g., original bytecode repository 1709 of FIG. 17) (2121) and creates new instrumented bytecode (e.g., instrumented bytecode 305 of FIG. 3) (2122). The instrumentation engine 314 then creates an instrumentation update request (e.g., instrumentation update request 1706 of FIG. 17) (2123) and sends the instrumentation update request 1706 to the agent 302 (e.g., agent 302 of FIG. 17) (2124). The process then ends (2125).

Figure 22:
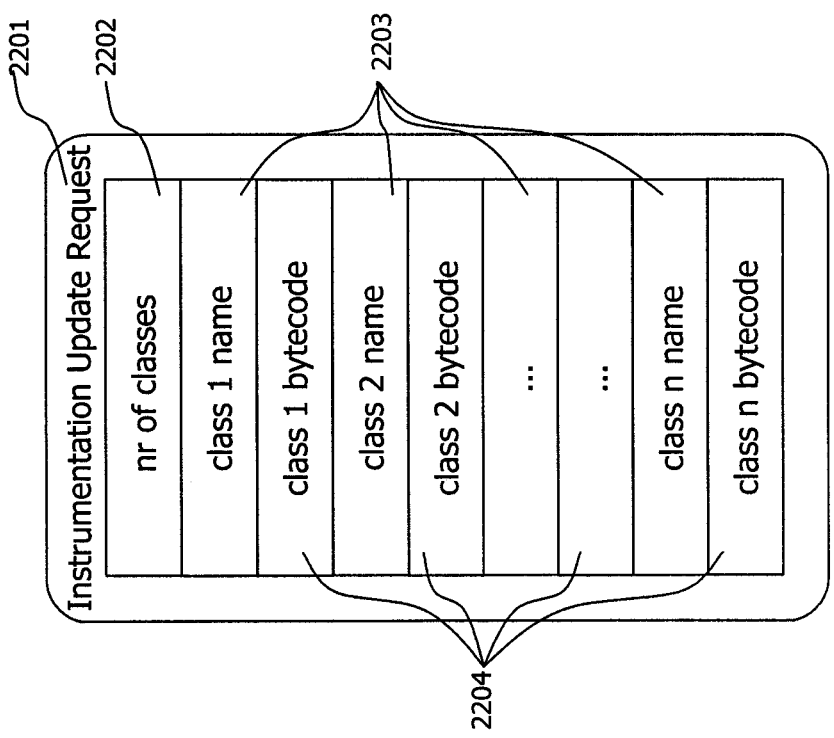
FIG. 22 is a block diagram illustrating an instrumentation update request

FIG. 22 is a block diagram illustrating an instrumentation update request 2201, which may include a nr of classes field 2202, which holds the number of classes for which instrumentation update should be performed. For each class to be updated, the instrumentation update request 2201 includes information to identify the class which should be updated (e.g., the full qualified name of the class 2203) and a class bytecode field 2204 which contains the instrumented bytecode (e.g., instrumented bytecode 305 of FIG. 3) which should be used instead of the original bytecode (e.g., original bytecode 304 of FIG. 3).

Figure 23:
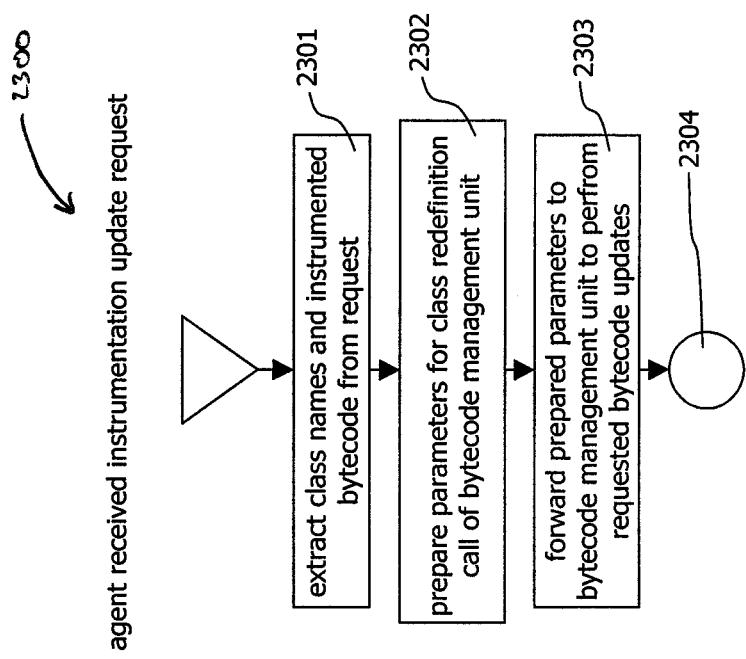
FIG. 23 is a flow diagram illustrating a method of updating bytecode instrumentation by an agent during application runtime.

FIG. 23 is a flow diagram 2300 illustrating a method of updating bytecode instrumentation by an agent (e.g., agent 302 of FIG. 17) during application runtime. First, the agent 302 extracts information to identify classes (e.g., the full qualified class name 2203 and respective instrumented bytecode 2204 from a received instrumentation update request 2201 of FIG. 22) (2302). The agent 302 then prepares parameters for the bytecode update request which may include, for example, fetching a class object that represents the class that should be updated (e.g., using the class name 2203 received with the instrumentation update request 2201) (2302). Afterwards, the agent 302 forwards the prepared parameters to a bytecode management unit (e.g., bytecode management unit 1703 of FIG. 17) of the virtual machine (e.g., virtual machine 1701 of FIG. 17), for example, by calling the JVMTI API method "RedefineClasses". The process then ends (2304).

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:
1. A method operated on each of a plurality of collector nodes, the method comprising:

receiving instrumentation rules associated to portions of an application to be instrumented for monitoring of the application from a monitoring node;
receiving original code for the application from an application node;
instrumenting the original code of the application in accordance with the instrumentation rules to produce instrumented code;
transferring the instrumented code to the application node for operation;
receiving event data produced from operation of the instrumented code of the application on the application node; and
transferring the event data to the monitoring node for correlation at the monitoring node.

2. The method of claim 1 further comprising, at the monitoring node, correlating the event data in accordance with a tag identifying the application that produced the event data.

3. The method of claim 1 wherein the instrumentation rules are received from the monitoring node, the method further comprising:
during an initial operation of the application at the application node and prior to receiving the instrumentation rules from the monitoring node:
extracting metadata from the original code; and
transferring the extracted metadata to the monitoring node.

4. The method of claim 1 further comprising instrumenting a plurality of applications to be operated on respective application nodes.

5. The method of claim 1 wherein receiving the event data includes buffering the event data prior to transferring the event data to the monitoring node for correlation, thereby minimizing runtime burden of operation of the application on the application node and allowing the event data to be transferred to the monitoring node over unreliable networks and low-bandwidth networks.

6. The method of claim 1 wherein metadata and event data transferred to the monitoring node are compressed or encrypted before being transferred to the monitoring node and instrumentation rules received from the monitoring node are decompressed or decrypted after being received from the monitoring node, thereby eliminating runtime burden of encrypting or compressing the event data during operation of the application on the application node.

7. The method of claim 1 further comprising:
providing decentralized instrumentation of a plurality of applications operating on respective application nodes; and
providing centralized management of instrumentation of a plurality of applications operating on respective application nodes, thereby enabling parallel instrumentation of multiple applications.

8. A method performed by a monitoring node, the method comprising:
transferring instrumentation rules associated to portions of an application to a collector node for monitoring of the application, the application having original code to be instrumented at the collector node in accordance with the instrumentation rules;
receiving event data from the collector node, the event data produced from operation of the instrumented code of the application at an application node;
correlating the received event data;
outputting the correlated event data for analysis; and
during an initial operation of the application at the application node and prior to transferring the instrumentation rules to the collector node:
receiving, from the collector node, metadata extracted from the original code; and
presenting a user configuration options regarding classes and methods available in the application for generating the instrumentation rules.

9. The method of claim 8 further comprising correlating the event data in accordance with a tag identifying the application that produced the event data.

10. The method of claim 8 further comprising, at the collector node, instrumenting a plurality of applications to be operated on respective application nodes.

11. The method of claim 8 further comprising receiving and correlating event data from a plurality of collector nodes.

12. The method of claim 8 wherein the method provides decentralized instrumentation of a plurality of applications operating on respective application nodes and centralized management of the instrumentation of the plurality of applications operating on respective application nodes, the decentralized instrumentation and centralized management minimizing runtime burden of operation of the applications on the respective application nodes, easing configuration of distributed monitoring systems via centralized instrumentation configuration via instrumentation rules, allowing encryption or compression of instrumentation rules prior to transferring the instrumentation rules to the collector node, and allowing decryption or decompression of the event data received from the collector node.

13. In a system comprising at least one application node, at least one collector node and a monitoring node, a method comprising
at the collector node, receiving instrumentation rules associated to portions of the application to be instrumented for monitoring of the application;
at the application node, transferring original code for an application, including an identifier unique to the instance of the application, to the collector node;
at the collector node:
receiving and instrumenting the original code of the application in accordance with the instrumentation rules to produce instrumented code; and
transferring the instrumented code to the application node;
at the application node:
operating the instrumented code of the application; and
transferring event data produced from operation of the instrumented code of the application;
at the collector node:
receiving the event data produced from operation of the instrumented code of the application on the application node; and
transferring the event data to the monitoring node for correlation at the monitoring node; and
at the monitoring node:
receiving the event data from the collector node produced from operation of the instrumented code of the application on the application node;
correlating the received event data; and
outputting the correlated event data for analysis.

14. The method of claim 13 wherein receiving instrumentation rules associated to portions of the application to be instrumented for monitoring of the application includes:
at the monitoring node,
transferring the instrumentation rules to the collector node; and at the collector node:
  receiving the instrumentation rules from the monitoring node; and
  storing the instrumentation rules at the collector node.

15. The method of claim 13 wherein transferring the original code for the application to the collector node includes:
at the application node:
  triggering an agent deployed in the application to intercept loading of the original code;
  transferring a connection request including an identifier unique to the instance of the application; and
at the collector node:
  extracting from the connection request the identifier unique to the instance of the application; and
  creating a copy of the instrumentation rules unique to the identifier, thereby guaranteeing the application identified by the identifier is instrumented using a consistent instrumentation rule set from connection of the agent until the agent is disconnected or the application is shut down.

16. The method of claim 13 wherein instrumenting the original code of the application includes:
  analyzing the original code of the application to extract and store metadata of the original code in a metadata repository;
  selecting methods to instrument in accordance with the instrumentation rules;
  fetching instrumentation rules specific to the agent identifier; and
  inserting sensors in the original code of the application to produce instrumented code for operation.

17. The method of claim 16 wherein inserting sensors in the original code of the application includes:
  creating a sensor metadata record with an identifier unique to the sensor;
  initializing the sensor metadata record with the extracted metadata;
  setting a flag indicating whether the metadata has been sent to the monitoring node;
  inserting the sensor metadata record into the metadata repository of the collector;
  selecting sensor code matching the sensor metadata and parameterizing it with the unique sensor identifier; and
  injecting the parameterized sensor code into the original code to produce instrumented code.

18. The method of claim 16 wherein operating the instrumented code of the application includes:
at the application node:
  creating an event record with an identifier unique to the sensor for each sensor execution during operation of the instrumented code;
  retrieving measurement data from the sensor and storing it in the event record;
  storing the event record to a fixed-size event buffer; and
  cyclically and asynchronously to operation of application code sending event records available in the fixed-size buffer to the collector node and deleting the sent event records from the fixed-size buffer.

19. The method of claim 13 wherein transferring the event data to the monitoring node includes:
  extracting from the event data an identifier unique to a sensor that produced the event data;
  querying an instrumentation metadata repository for a sensor metadata record matching the identifier;
  determining whether a flag is set in the sensor metadata record indicating that the metadata has not been sent to the monitoring node;
  if the flag is set, sending the sensor metadata record to the monitoring node and clearing the flag; and
  sending the event data to the monitoring node.

20. The method of claim 13 wherein receiving the event data from the collector node includes:
  extracting a class key from a sensor metadata record;
  querying a metadata repository for a class metadata record with the class key;
  if the class metadata record is not found, fetching the class metadata record and associated method metadata records from the collector node and inserting the class metadata record and method metadata records into the metadata repository; and
  inserting the sensor metadata record into the metadata repository.

21. The method of claim 20 wherein fetching the class metadata record and associated method metadata records includes:
at the collector node:
  querying the metadata repository with the class key for the class metadata record and method metadata records; and
  transferring the class metadata record and method metadata records to the monitoring node.

22. The method of claim 13 wherein receiving the event data from the collector node includes:
  extracting from an event record an identifier unique to a sensor that produced the event record;
  querying an instrumentation metadata repository with the sensor identifier for sensor metadata; and
  if the sensor metadata is found, forwarding the event record and the sensor metadata record to a correlation engine.

23. The method of claim 13 wherein correlating the received event data includes:
  correlating an event record and sensor metadata with existing event records in an event collector; and
  storing the correlation result in a measurement buffer.

24. The method of claim 13 wherein the collector node reports information to the monitoring node, including available buffer space in an event buffer, the method further comprising, at the monitoring node, determining a collector node from which to receive event data according to reported available event buffer space to receive event records from collector nodes with inadequate available event buffer space.

25. The method of claim 13 further comprising:
  at the collector node, receiving an instrumentation rule update request including an instrumentation rule update;
  retrieving the code affected by the instrumentation rule update request;
  applying the instrumentation rule update to the instrumentation rules; and
  instrumenting the code in accordance with the updated instrumentation rules.

26. The method of claim 25 further comprising:
  at the collector node, sending an instrumentation update request to an application identified in the instrumentation rule update request; and
  at the application node, sending a code update request to a management unit of the application node to perform the code update at runtime.

27. The method of claim 26 wherein the code update performs one of, at application runtime, adding instrumentation code to original code, adding additional instrumentation code to already instrumented code, removing instrumentation code and restoring original code.

28. The method of claim 13 wherein metadata and event data transferred from the collector node to the monitoring node are compressed or encrypted at the collector node before being transferred to the monitoring node and instrumentation rules received at the collector node from the monitoring node are decompressed or decrypted at the collector node after being received from the monitoring node, thereby eliminating runtime burden of encrypting or compressing the event data during operation of the application on the application node.

29. A method performed by a monitoring node, the method comprising:
transferring instrumentation rules associated to portions of an application to a collector node for monitoring of the application, the application having original code to be instrumented at the collector node in accordance with the instrumentation rules;
receiving event data from the collector node, the event data produced from operation of the instrumented code of the application at an application node;
correlating the received event data;
outputting the correlated event data for analysis; and
receiving and correlating event data from a plurality of collector nodes.

30. A method performed by a monitoring node, the method comprising:
transferring instrumentation rules associated to portions of an application to a collector node for monitoring of the application, the application having original code to be instrumented at the collector node in accordance with the instrumentation rules;
receiving event data from the collector node, the event data produced from operation of the instrumented code of the application at an application node;
correlating the received event data;
outputting the correlated event data for analysis;
wherein the method provides decentralized instrumentation of a plurality of applications operating on respective application nodes and centralized management of the instrumentation of the plurality of applications operating on respective application nodes, the decentralized instrumentation and centralized management minimizing runtime burden of operation of the applications on the respective application nodes, easing configuration of distributed monitoring systems via centralized instrumentation configuration via instrumentation rules, allowing encryption or compression of instrumentation rules prior to transferring the instrumentation rules to the collector node, and allowing decryption or decompression of the event data received from the collector node.

31. A system comprising:
a plurality of collector nodes, each of the plurality of collector nodes comprising:
means for receiving instrumentation rules associated to portions of an application to be instrumented for monitoring of the application from a monitoring node;
means for receiving original code for the application from an application node;
means for instrumenting the original code of the application in accordance with the instrumentation rules to produce instrumented code; transferring the instrumented code to the application node for operation;
means for receiving event data produced from operation of the instrumented code of the application on the application node; and
means for transferring the event data to the monitoring node for correlation at the monitoring node.

32. The system of claim 31, wherein the plurality of collector nodes further comprises means for instrumenting a plurality of applications to be operated on respective application nodes.

33. The system of claim 31, wherein the plurality of collector nodes further comprises:
means for providing decentralized instrumentation of a plurality of applications operating on respective application nodes; and
means for providing centralized management of instrumentation of a plurality of applications operating on respective application nodes, thereby enabling parallel instrumentation of multiple applications.

34. A system comprising a monitoring node, the monitoring node comprising:
means for transferring instrumentation rules associated to portions of an application to a collector node for monitoring of the application, the application having original code to be instrumented at the collector node in accordance with the instrumentation rules;
means for receiving event data from the collector node, the event data produced from operation of the instrumented code of the application at an application node;
means for correlating the received event data;
means for outputting the correlated event data for analysis; and
means for receiving, from the collector node, metadata extracted from the original code during an initial operation of the application at the application node and prior to transferring the instrumentation rules to the collector node; and
means for presenting a user configuration options regarding classes and methods available in the application for generating the instrumentation rules during an initial operation of the application at the application node and prior to transferring the instrumentation rules to the collector node.

35. A system comprising:
at least one application node,
at least one collector node; and
a monitoring node; wherein
the collector node comprises means for receiving instrumentation rules associated to portions of the application to be instrumented for monitoring of the application;
the application node comprises means for transferring original code for an application, including an identifier unique to the instance of the application, to the collector node;
the collector node comprises:
means for receiving and instrumenting the original code of the application in accordance with the instrumentation rules to produce instrumented code; and
means for transferring the instrumented code to the application node;
the application node further comprises:
means for operating the instrumented code of the application; and
means for transferring event data produced from operation of the instrumented code of the application;
the collector node further comprises:
means for receiving the event data produced from operation of the instrumented code of the application on the application node; and
means for transferring the event data to the monitoring node for correlation at the monitoring node; and the monitoring node comprises:

means for receiving the event data from the collector node produced from operation of the instrumented code of the application on the application node;

means for correlating the received event data; and means for outputting the correlated event data for analysis.

36. The system of claim 35, wherein the collector node further comprises:

means for compressing or encrypting metadata and event data transferred from the collector node to the monitoring node before being transferred to the monitoring node; and means for decompressing or decrypting instrumentation rules received at the collector node from the monitoring node after being received from the monitoring node, thereby eliminating runtime burden of encrypting or compressing the event data during operation of the application on the application node.

37. A system comprising a monitoring node, the monitoring node comprising:

means for transferring instrumentation rules associated to portions of an application to a collector node for monitoring of the application, the application having original code to be instrumented at the collector node in accordance with the instrumentation rules;

means for receiving event data from the collector node, the event data produced from operation of the instrumented code of the application at an application node;

means for correlating the received event data;

means for outputting the correlated event data for analysis; and means for receiving and correlating event data from a plurality of collector nodes.

38. A system comprising a monitoring node, the monitoring node comprising:

means for transferring instrumentation rules associated to portions of an application to a collector node for monitoring of the application, the application having original code to be instrumented at the collector node in accordance with the instrumentation rules;

means for receiving event data from the collector node, the event data produced from operation of the instrumented code of the application at an application node;

means for correlating the received event data;

means for outputting the correlated event data for analysis;

wherein the system provides decentralized instrumentation of a plurality of applications operating on respective application nodes and centralized management of the instrumentation of the plurality of applications operating on respective application nodes, the decentralized instrumentation and centralized management minimizing runtime burden of operation of the applications on the respective application nodes, easing configuration of distributed monitoring systems via centralized instrumentation configuration via instrumentation rules, allowing encryption or compression of instrumentation rules prior to transferring the instrumentation rules to the collector node, and allowing decryption or decompression of the event data received from the collector node.

* * * * *

UNITED STATES PATENT AND TRADEMARK OFFICE
CERTIFICATE OF CORRECTION

| | | |
|---|---|---|
| PATENT NO. | : 8,533,687 B1 | |
| APPLICATION NO. | : 12/627183 | |
| DATED | : September 10, 2013 | |
| INVENTOR(S) | : Bernd Greifeneder et al. | |

It is certified that error appears in the above-identified patent and that said Letters Patent is hereby corrected as shown below:

In the Drawings:

On sheet 14 of 23, line 1 (Reference Numeral 1405) (FIG. 14), delete "ditry" and insert -- dirty --, therefor.

On sheet 14 of 23, line 3 (Reference Numeral 1410) (FIG. 14), delete "ditry" and insert -- dirty --, therefor.

On sheet 16 of 23, line 1 (Reference Numeral 1604) (FIG. 16), delete "encyper" and insert -- encipher --, therefor.

On sheet 23 of 23, line 2 (Reference Numeral 2303) (FIG. 23), delete "perfrom" and insert -- perform --, therefor.

In the Specifications:

In column 5, line 67, delete "request" and insert -- request. --, therefor.

In column 19, line 67, delete "ends (2106)" and insert -- ends (2106). --, therefor.

Signed and Sealed this
Twenty-ninth Day of April, 2014

Michelle K. Lee
*Deputy Director of the United States Patent and Trademark Office*